US011697414B2

(12) United States Patent
Simmons et al.

(10) Patent No.: US 11,697,414 B2
(45) Date of Patent: Jul. 11, 2023

(54) SYSTEM AND METHOD FOR REMOTE AUTOMATED VEHICLE ALIGNMENT WITH A TRAILER FOR HITCHING

(71) Applicant: Ford Global Technologies, LLC, Dearborn, MI (US)

(72) Inventors: Kyle Simmons, New Boston, MI (US); Luke Niewiadomski, Dearborn, MI (US); Roger Trombley, Ann Arbor, MI (US); Frederic Christen, Walhorn (BE); Christoph Kessler, Langerwehe (DE); Katherine Rouen, Livonia, MI (US); Erick Michael Lavoie, Van Buren Charter Township, MI (US); Hamid M. Golgiri, Livonia, MI (US); Bruno Sielly Jales Costa, Santa Clara, CA (US); Nikhil Nagraj Rao, Cupertino, CA (US); Vidya Nariyambut Murali, Sunnyvale, CA (US); John Michael Celli, Westland, MI (US); Frank Golub, Oak Park, MI (US); Seyed Armin Raeis Hosseiny, Canton, MI (US); Bo Bao, Bloomfield, MI (US); Siyuan Ma, Detroit, MI (US); Hemanth Yadav Aradhyula, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 136 days.

(21) Appl. No.: 16/821,034

(22) Filed: Mar. 17, 2020

(65) Prior Publication Data

US 2021/0291832 A1    Sep. 23, 2021

(51) Int. Cl.
*B60W 30/18* (2012.01)
*B60W 10/20* (2006.01)
(Continued)

(52) U.S. Cl.
CPC ...... *B60W 30/18036* (2013.01); *B60W 10/04* (2013.01); *B60W 10/20* (2013.01);
(Continued)

(58) Field of Classification Search
CPC ........... B60W 30/18036; B60W 10/04; B60W 10/20; B60W 50/10
See application file for complete search history.

(56) References Cited

U.S. PATENT DOCUMENTS 8,888,120 B2    11/2014   Trevino
8,888,121 B2    11/2014   Trevino et al.
(Continued)

FOREIGN PATENT DOCUMENTS

DE    102012009623 A1    11/2013

*Primary Examiner* — Jelani A Smith
*Assistant Examiner* — Toya Pettiegrew
(74) *Attorney, Agent, or Firm* — Lorne Forsythe; Price Heneveld LLP

(57) ABSTRACT

A system for assisting in aligning a vehicle for hitching with a trailer includes a vehicle steering system, a wireless communication module, a detection system outputting a signal including scene data of an area to a rear of the vehicle, and a controller. The controller receives, via the wireless communication module, an automated hitching initiation command from an external wireless device, receives the scene data and identifying the trailer within the area to the rear of the vehicle, derives a backing path to align a hitch ball mounted on the vehicle to a coupler of the trailer, and controls the vehicle steering system to maneuver the vehicle including reversing along the backing path.

20 Claims, 25 Drawing Sheets

(51) Int. Cl.
  *B60W 10/04* (2006.01)
  *B60W 50/10* (2012.01)

(52) U.S. Cl.
  CPC ......... *B60W 50/10* (2013.01); *B60W 2300/14* (2013.01); *B60W 2554/801* (2020.02); *B60W 2554/802* (2020.02)

(56) References Cited

U.S. PATENT DOCUMENTS

| | | | |
|---|---|---|---|
| 9,233,710 B2 | 1/2016 | Lavoie et al. | |
| 9,499,018 B2 | 11/2016 | Gehrke et al. | |
| 9,656,690 B2 | 5/2017 | Shen et al. | |
| 9,880,560 B2 * | 1/2018 | Han | G05D 1/0234 |
| 9,914,333 B2 | 3/2018 | Shank et al. | |
| 10,196,089 B2 | 2/2019 | Herzog et al. | |
| 10,234,868 B2 | 3/2019 | Lavoie et al. | |
| 2013/0253814 A1 * | 9/2013 | Wirthlin | G01G 19/02 701/1 |
| 2015/0108299 A1 * | 4/2015 | Seal | F16M 13/00 248/205.1 |
| 2015/0115571 A1 | 4/2015 | Zhang et al. | |
| 2016/0052548 A1 * | 2/2016 | Singh | B62D 15/028 701/41 |
| 2017/0192428 A1 | 7/2017 | Vogt et al. | |
| 2018/0039278 A1 | 2/2018 | Hüger et al. | |
| 2018/0147900 A1 * | 5/2018 | Shank | B60R 16/0373 |
| 2018/0191937 A1 * | 7/2018 | Frederick | B60Q 1/2607 |
| 2018/0272941 A1 * | 9/2018 | Bliss | B62D 15/0295 |
| 2019/0018132 A1 * | 1/2019 | Decker | G01S 13/931 |
| 2019/0086927 A1 * | 3/2019 | Skvarce | B60D 1/06 |
| 2020/0353969 A1 * | 11/2020 | Sypitkowski | B62D 15/028 |
| 2021/0114657 A1 * | 4/2021 | Lu | B60D 1/62 |

* cited by examiner

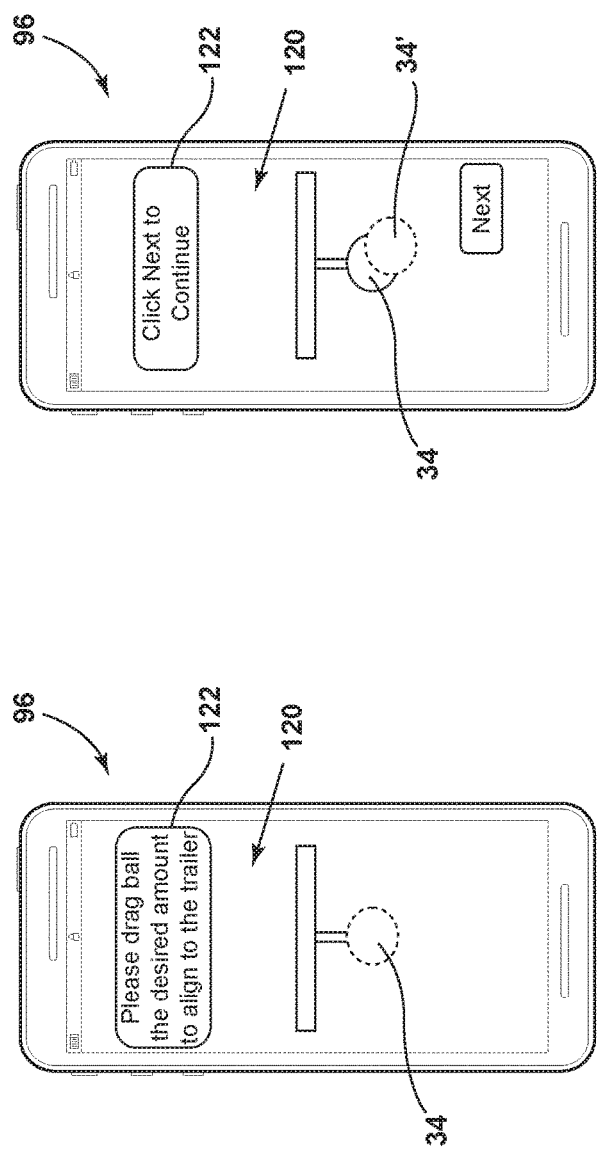
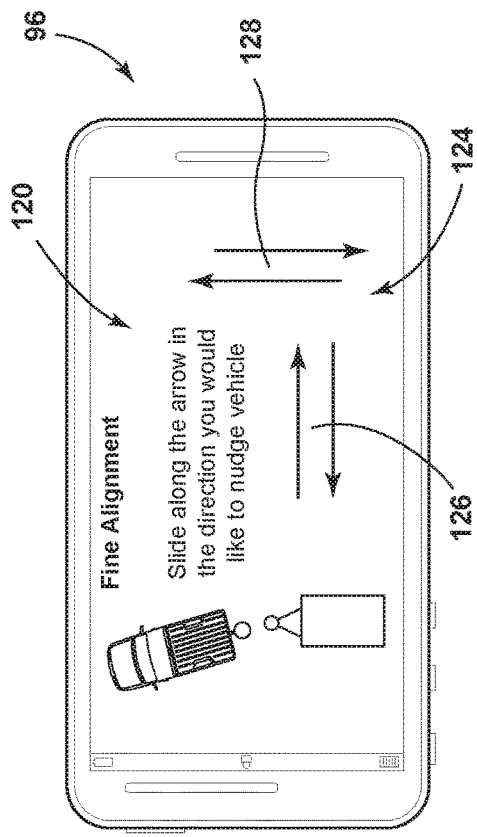
FIG. 19A
FIG. 19B
FIG. 20

SYSTEM AND METHOD FOR REMOTE AUTOMATED VEHICLE ALIGNMENT WITH A TRAILER FOR HITCHING

FIELD OF THE INVENTION

The present invention generally relates to a vehicle hitch assistance system. In particular, the system provides various forms of remote operation using a device external to the vehicle.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause the vehicle to come into contact with the trailer. Accordingly, further advancements may be desired.

SUMMARY OF THE INVENTION

According to one aspect of the present disclosure, a system for assisting in aligning a vehicle for hitching with a trailer includes a vehicle steering system, a wireless communication module, a detection system outputting a signal including scene data of an area to a rear of the vehicle, and a controller. The controller receives, via the wireless communication module, an automated hitching initiation command from an external wireless device, receives the scene data and identifies the trailer within the area to the rear of the vehicle, derives a backing path to align a hitch ball mounted on the vehicle to a coupler of the trailer, and controls the vehicle steering system to maneuver the vehicle including reversing along the backing path.

Embodiments of the first aspect of the invention can include any one or a combination of the following features:
- the system further includes a vehicle-human machine interface positioned within the vehicle, and the controller further receives a system activation command from a user via the vehicle-human machine interface prior to receiving the automated hitching initiation command from the external wireless device;
- the external wireless device is a smartphone including memory encoded with an application that facilitates communication of the smartphone with the wireless communication module, requests a user input of the automated hitching initiation command, and provides information related to a status of the controller in controlling the vehicle;
- the application further displays a graphic representation of at least one desired range of user locations relative to the vehicle in which the user is directed to be positioned during maneuvering of the vehicle including reversing along the backing path;
- the external wireless device is a key fob configured for wireless communication with the wireless communication module and including a button transmitting the automated hitching command when depressed by a user;
- the key fob further includes a lighted element exposed on a portion thereof, and the controller identifies the lighted element in the scene data and associates a position of the lighted element with a position of the coupler of the trailer for use in deriving the backing path;
- the controller, while maneuvering the vehicle including reversing along the backing path, determines that the hitch ball is within a threshold distance of the coupler and pauses for a user confirmation that a height of the coupler relative to the hitch ball is acceptable before continuing maneuvering the vehicle including reversing along the backing path to vertically align the hitch ball with the coupler;
- when the controller completes maneuvering the vehicle including reversing along the path, the controller further receives a user indication of a direction and distance of misalignment between the hitch ball and the coupler along a driving plane, derives a correction backing path to realign the hitch ball to the coupler based on the user indication, and further controls the vehicle steering system to maneuver the vehicle including reversing along the correction backing path;
- the external wireless device is a smartphone including memory encoded with an application that facilitates communication of the smartphone with the wireless communication module, and the controller receives the user indication via the wireless communication module from the smartphone;
- the system further includes an interaction detection system, and the controller receives the user indication, in the form of one of a voice command or a physical vehicle interaction, via the interaction detection system;
- the system further includes a powertrain control system within the vehicle, and the controller further determines that the vehicle has reached the end of the path and transmits a powertrain deactivation signal to the powertrain control system;
- the controller, upon receiving the scene data, determines that the trailer is not within the area to the rear of the vehicle and completes an initial alignment maneuver to position the vehicle relative to the trailer such that the trailer is within the area to the rear of the vehicle prior to deriving the backing path and maneuvering the vehicle along the path;
- the initial alignment maneuver includes determining a preliminary trailer position using data received from the external wireless device via the wireless communication module;
- the external wireless device is a smartphone including memory encoded with an application that facilitates communication of the smartphone with the wireless communication module, and the data received from the external wireless device includes image, location, and heading data from the smartphone relative to the trailer and relative to the vehicle;
- completing the initial alignment maneuver includes determining a position of the vehicle, retrieving a stored location of the trailer from memory, and comparing the stored location of the trailer to the position of the vehicle; and completing the initial alignment maneuver includes receiving a user input of an approximate position and heading of the vehicle relative to the trailer.

According to another aspect of the present disclosure, a vehicle includes a steering system, a wireless communication module, a detection system outputting a signal including scene data of an area to a rear of the vehicle, and system for assisting in aligning a vehicle for hitching with a trailer. The system includes a controller receiving, via the wireless communication module, an automated hitching initiation command from an external wireless device, receiving the scene data and identifying the trailer within the area to the rear of the vehicle, deriving a backing path to align a hitch ball mounted on the vehicle to a coupler of the trailer, controlling the vehicle steering system to maneuver the vehicle including reversing along the backing path.

According to another aspect of the present disclosure, a method for assisting a vehicle in hitching with a trailer includes receiving, via a wireless communication module within the vehicle, an automated hitching initiation command from an external wireless device positioned outside the vehicle, receiving scene data of an area to a rear of the vehicle from a detection system outputting a signal including the scene data and identifying the trailer within the area to the rear of the vehicle, deriving a backing path to align a hitch ball mounted on the vehicle to a coupler of the trailer, and controlling a vehicle steering system to maneuver the vehicle including reversing along the backing path.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIGS. 19A and 19B is an alternative implementation of the alignment interface providing for input of alignment direction and distance;

FIG. 20 is a further alternative implementation of the alignment interface providing for input of directions for discrete vehicle nudges executed by the system;

DETAILED DESCRIPTION OF THE PREFERRED EMBODIMENTS

Figure 1:
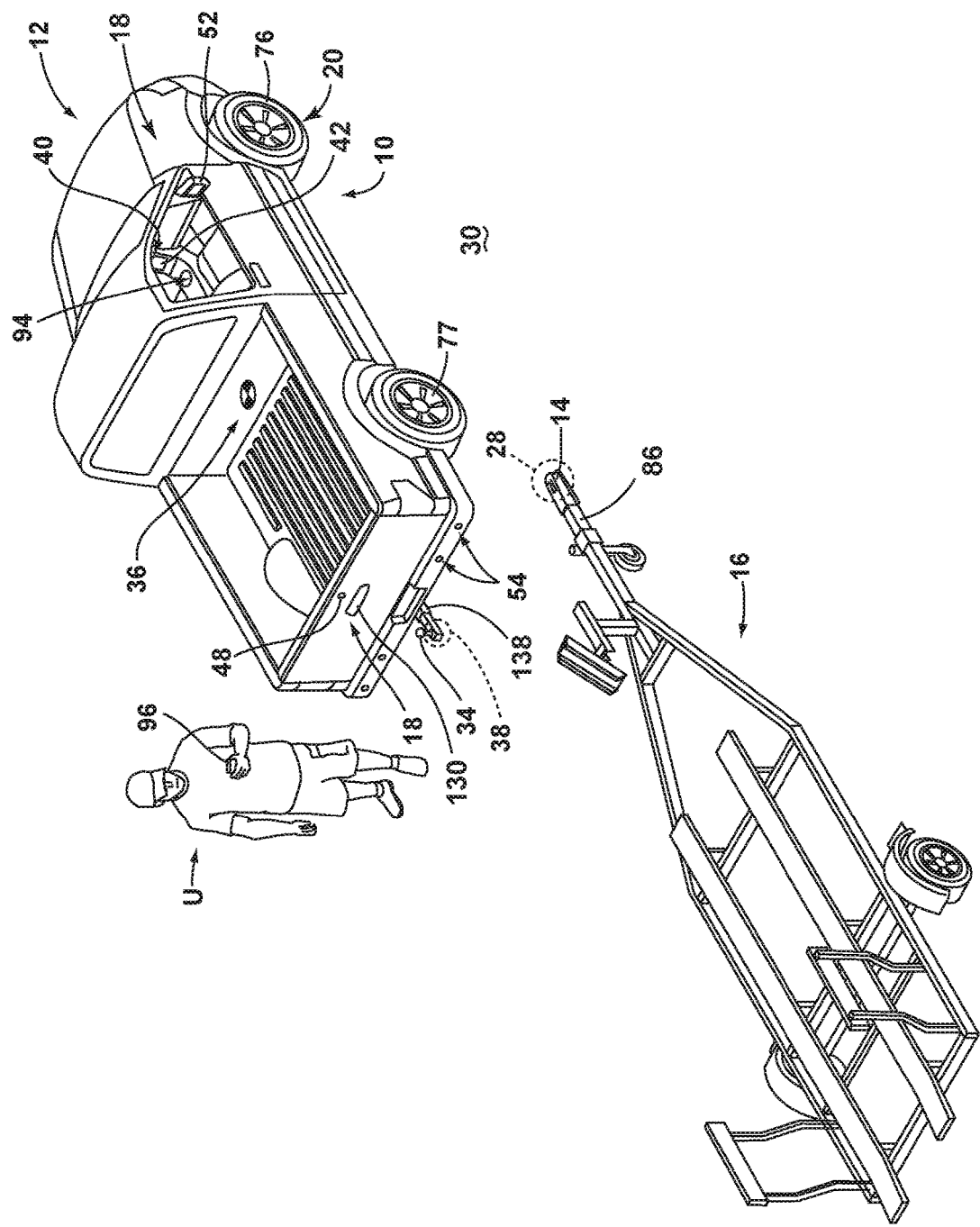
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-6, reference numeral 10 designates a hitch assistance system (also referred to as a "hitch assist" system or a "hitching assistance" system) for a vehicle 12. In particular system 10 includes a vehicle steering system 20, a wireless communication module 94, a detection system 104 outputting a signal including scene data 55 of an area to a rear of the vehicle 12, and a controller 26. The controller 26 receives, via the wireless communication module 94, an automated hitching initiation command from an external wireless device 96, receives the scene data 55 and identifies the trailer 16 within the area to the rear of the vehicle 12, derives a backing path 32 to align a hitch ball 34 mounted on the vehicle 12 to a coupler 14 of the trailer 16, and controls the vehicle steering system 20 to maneuver the vehicle 12 including reversing along the backing path 32.

Figure 2:
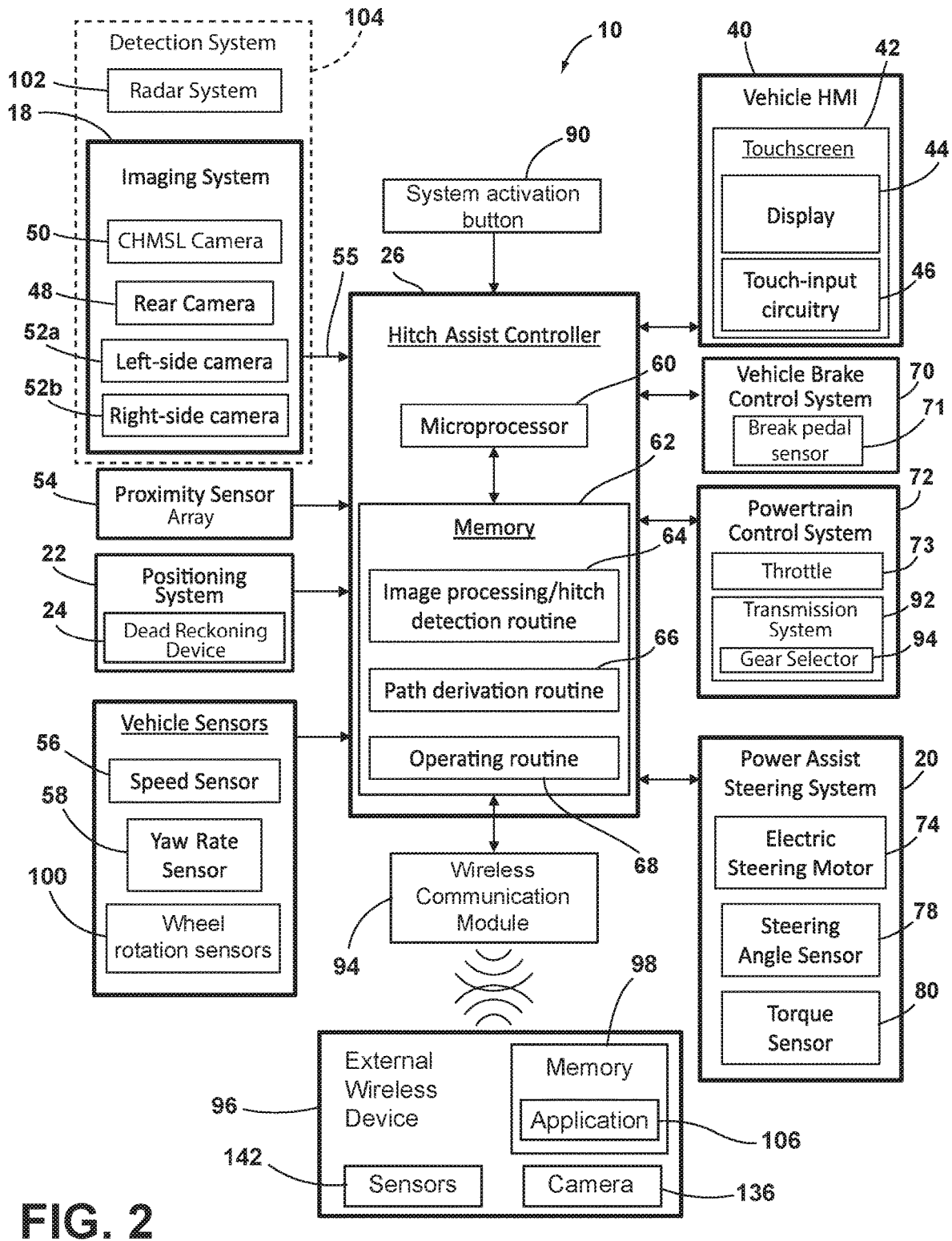
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle S. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle S. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command 69 may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
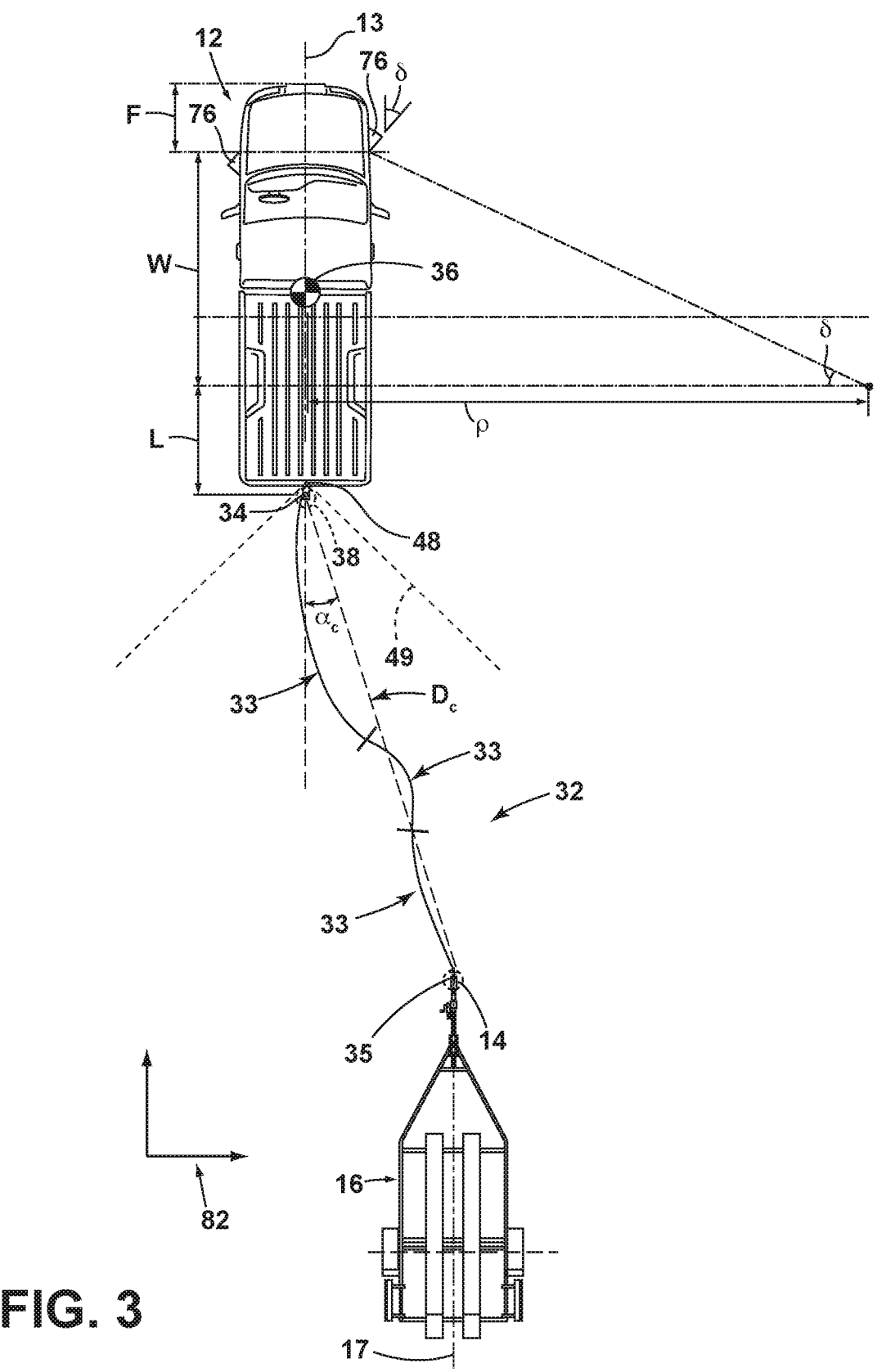
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle S. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate γ, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for unintended contact with trailer 16, and can bring vehicle 12 to a complete stop at a determined endpoint 35 of path 32. It is disclosed herein that the hitch assist system 10 can additionally or alternatively issue an alert signal corresponding to a notification of any actual, impending, and/or anticipated unintended contact with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent unintended contact with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing routine 64 and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CHMSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which may correspond with rear camera 48, center high-mount stop light (CHMSL) camera 50, and side-view cameras 52a and 52b, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view 49, 51, 53a, 53b, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36. In one aspect, the various systems and vehicle features discussed herein, including imaging system 18, positioning system 22, brake control system 70, powertrain control system 72, power assist steering system 20, proximity sensor array 54, positioning system 22, and the vehicle sensors discussed herein my generally used for purposes of vehicle control, such as under control of the user, including potentially with assistance of an on-board computer or other processor communicating with the systems and features. In this manner, the systems and features can be referred to collectively as a vehicle control system that may be utilized by controller 26 for the automatic vehicle control functionality discussed herein.

The image processing routine 64 can be specifically programmed or otherwise configured to locate coupler 14 within image data 55. In an example, the image processing routine 64 can first attempt to identify any trailers 16 within the image data 55, which can be done based on stored or otherwise known visual characteristics of trailer 16, of an number of different types, sizes or configurations of trailers compatible with system 10, or trailers in general. Controller 26 can seek confirmation from the user that the identification of the trailer 16 is accurate and is the correct trailer for which to complete an assisted hitching operation, as described further below. After the trailer 16 is identified, controller 26 may then identify the coupler 14 of that trailer 16 within the image data 55 based, similarly, on stored or otherwise known visual characteristics of coupler 14 or couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the position 28 of coupler 14 can be determined based on the marker location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55.

In various examples, controller 26 may initially rely on the identification of trailer 16 for the initial stages of an automated hitching operation, with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data 55 makes it possible to accurately identify trailer 16, but at which the coupler 14 cannot be precisely identified. In this manner, initial rearward movement of vehicle 12 can allow for calibration of various system 10 inputs or measurements that can improve the accuracy of distance measurements, for example, that can help make coupler 14 identification more accurate. Similarly, movement of vehicle 12 resulting in a change to the particular image within the data 55 that can improve the resolution or move the coupler 14 relative to the remaining portions of trailer 16 such that it can be more easily identified.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data 55 and at least attempt to estimate the position 28 of coupler 14 relative to hitch ball 34 using the image data 55 in accordance with one of the examples discussed above to determine a distance $D_c$ to coupler 14 and an angle $\alpha_c$ of offset between a line connecting hitch ball 34 and coupler 14 and the longitudinal axis of vehicle 12. Image processing routine 64 can also be configured to identify the trailer 16 overall and can use the image data of trailer 16, alone or in combination with the image data of coupler 14, to determine the orientation or heading 33 of trailer 16. In this manner the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without unintended contact between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{W}{\tan\delta}, \qquad (1)$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{W}{\tan\delta_{max}}. \qquad (2)$$

Path derivation routine 66 can be programmed to derive vehicle path 32 to align a known location of the vehicle hitch ball 34 with the estimated position 28 of coupler 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. It is noted that hitch assist system 10 can compensate for horizontal movement $\Delta x$ of coupler 14 in a driving direction by determining the movement of coupler 14 in the vertical direction $\Delta y$ that will be needed to receive hitch ball 34 within coupler 14. Such functionality is discussed further in co-pending, commonly-assigned U.S. patent application Ser. Nos. 14/736,391 and 16/038,462, the entire disclosures of which are hereby incorporated by reference herein.

As discussed above, once the desired path 32, including endpoint 35, has been determined, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle δ, as dictated by path 32, depending on the position of vehicle 12 therealong. It is additionally noted that in an embodiment, the path 32 may comprise a progression of steering angle δ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include two portions defined by steering of wheels 76 in different directions to collectively traverse the needed lateral movement of vehicle 12, while providing final straight, rearward backing segment to bring hitch ball 34 into the above-described offset alignment with coupler 14. It is noted that variations in the depicted path 32 may be used. It is further noted that the estimates for the positioning $D_c$, $\alpha_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from a portable device 96, such a smartphone, can be fine-tuned once the image processing routine 64 can identify coupler 14 in the image data 55, with continued updates for path 32 being similarly derived as the image data 55 becomes increasingly clear during the approach toward trailer 16. It is further noted that, until such a determination can be made, the dead reckoning device 24 can be used to track the location of vehicle 12 in its movement along path 32 toward the initially-derived endpoint 35.

Figure 4:
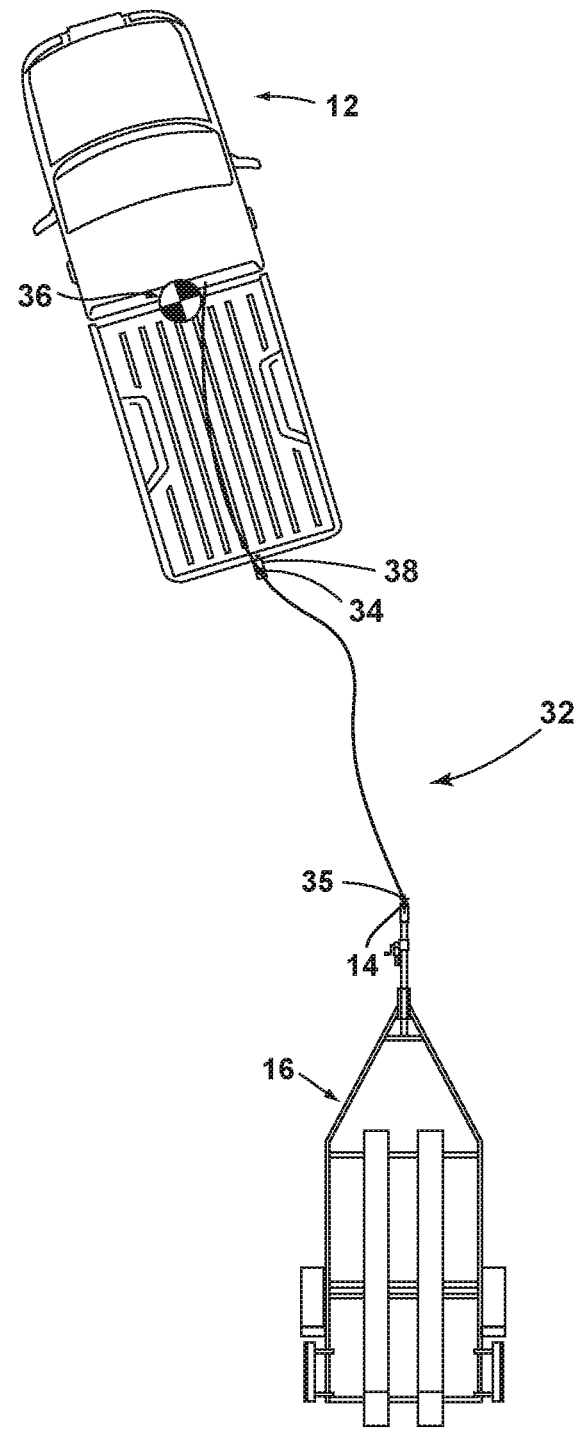
FIG. 4 is an overhead schematic view of the vehicle during a subsequent step of the alignment sequence with the trailer.
Figure 5:
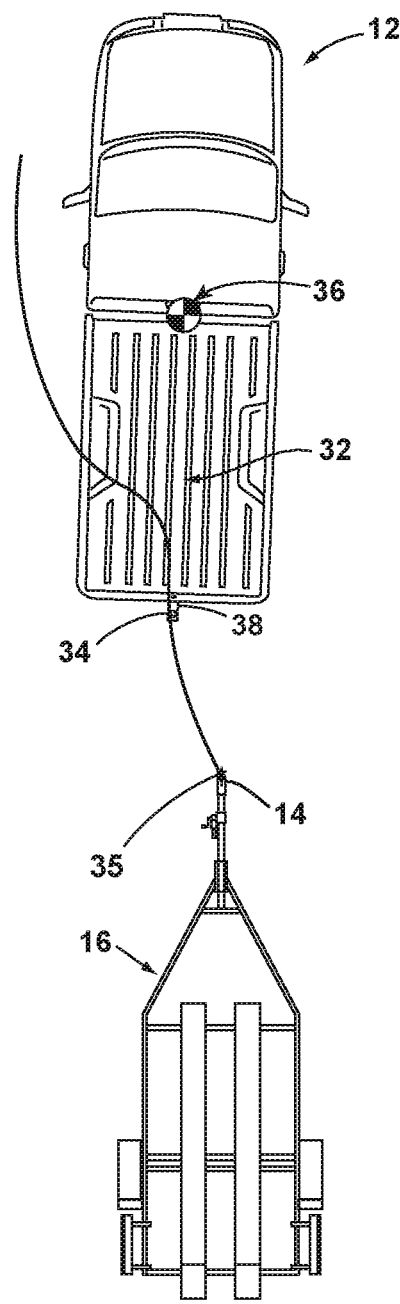
FIG. 5 is an overhead schematic view of the vehicle during a subsequent step of the alignment sequence with the trailer.
Figure 6:
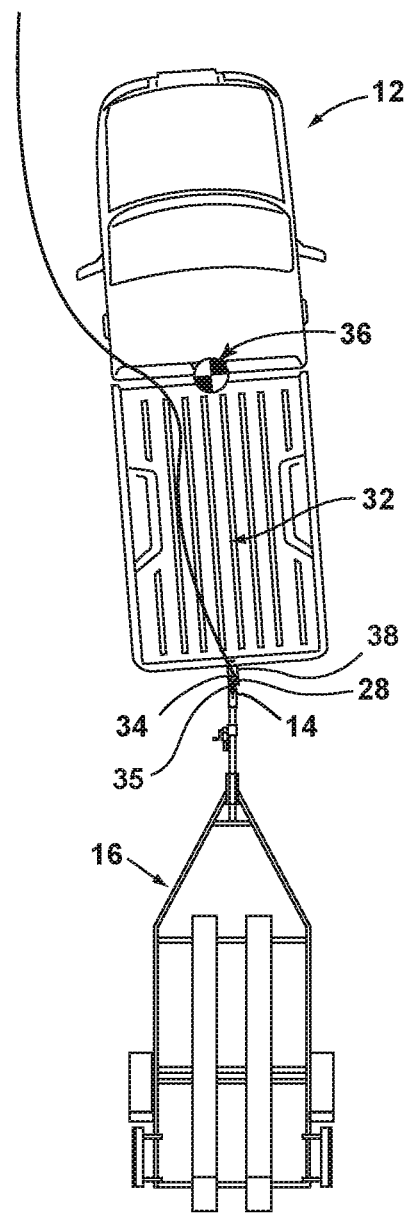
FIG. 6 is an overhead schematic view of the vehicle during a subsequent step of the alignment sequence with the trailer and showing the position of a hitch ball of the vehicle at an end of a derived alignment path.

As shown in FIGS. 4-6, once the trailer 16 and coupler 14 have been identified, and system 10 determines the path 32 to align hitch ball 34 with the coupler 14, the controller 26 executing operating routine 68 may continue to control vehicle 12 until hitch ball 34 is in the desired endpoint 35 relative to coupler 14 for coupler 14 to engage with hitch ball 34 when coupler 14 is lowered into horizontal alignment therewith. In the example discussed above, image processing routine 64 continuously monitors the positioning $D_c$, $\alpha_c$ of coupler 14, constantly or once available, during execution of operating routine 68, including as coupler 14 comes into clearer view of rear camera 48, with continued movement of vehicle 12 along path 32. As discussed above, the position of vehicle 12 can also be monitored by dead reckoning device 24 with the position 28 of coupler 14 being continuously updated and fed into path derivation routine 66 in case path 32 and or endpoint 35 can be refined or should be updated (due to, for example, improved height $H_c$, distance $D_c$, or offset angle $\alpha_c$ information due to closer resolution or additional image data 55), including as vehicle moves closer to trailer 16, as shown in FIGS. 4 and 5. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$ of coupler 14 to converge the known relative position of hitch ball 34 to the desired position 38d thereof relative to the tracked position 28 of coupler 14, as discussed above and shown in FIG. 6.

During an assisted hitching operation, such as in the example described with respect to FIGS. 4-6, system 10 requires a minimum amount of longitudinal distance between the vehicle 12 and the trailer 16 to control movement of vehicle 12 with a level of precision desired to achieve the desired final position of hitch ball 34 with respect to coupler 14 (i.e., without overshooting the desired final location, such that hitch ball 34 moves past the coupler 14, or otherwise ending operating routine 68 with hitch ball 34 positioned relative to coupler 14 such that manual movement of trailer 16 is required). The required minimum distance can vary but is generally influenced by the requirements of image processing routine 64, as well as the requirements of speed sensor 56, the responsiveness of the throttle 73 and vehicle brake control system 70, as well as the general processing speed of controller 26 of other components of system 10. In one example, image processing routine 64 may require a minimum travel distance for calibration thereof, including to accurately identify coupler 14 and to assist in tracking of vehicle 12 movement. The particular minimum distance can be estimated for a given implementation of system 10, based on known values or estimates for such factors.

As mentioned above, the "longitudinal control" in an assisted hitching maneuver is the portion of vehicle 12 movement along path 32 controlled by the vehicle powertrain control system 72 and the vehicle brake system 70 with the "longitudinal control" being the portion controlled by the power assist steering system 20. It is to be understood that the lateral control requires movement of the vehicle such that the two control schemes operate together to move vehicle 12 along the path 32. In this respect, the longitudinal alignment of the path 32 with the coupler 14 is dictated by the longitudinal control (i.e., by the steering system 20) and the final stopping point of vehicle 12 along path 32 is dictated by the longitudinal control. In this respect, the final stopping point of the vehicle 12 along path 32 determines the alignment in the direction of travel between hitch ball 34 and coupler 14. In this manner, system 10 may be able to move vehicle 12 to the final target position in a precise manner, for example, such that trailer 16 does not have to be manually repositioned by the user, but can simply be lowered onto hitch ball 34. In one implementation of system 10, the accuracy in final longitudinal alignment of hitch ball 34 with coupler 14 can be to within 1 cm of a completely aligned position (center-to-center). Again, the particular implementation of system 10 can be such that controller 26 requires a minimum amount of longitudinal travel distance to perform a sequence of events for the desired hitch ball 34 and coupler 14 alignment. Such a sequence can include increasing the engine speed (using throttle 73 via powertrain control system 72) and reducing the brake pressure (via brake control system 70) until vehicle 12 begins moving. Controller 26 can receive feedback data during vehicle 12 movement regarding measured vehicle speed and localization (by way of speed sensor 56 and positioning system 22, respectively) such that controller 26 can apply brake pressure and reduce engine speed to bring the vehicle 12 to a standstill at the final target position with hitch ball 34 at endpoint 35.

Figure 7:
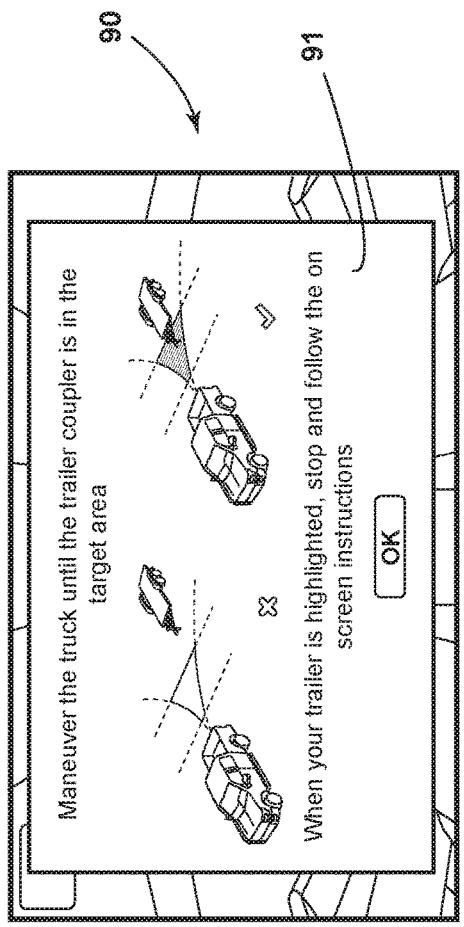
FIG. 7 is a depiction of a message presentable to a user of the system instructing the user in positioning the vehicle relative to the trailer for standard system operation.

As can be appreciated, the system 10, operating as described above, controls vehicle 12 to align the hitch ball 34 with the coupler 14 of trailer 16 in a narrowly defined scenario. In particular, the described system 10 operation can include asking the driver to first maneuver the vehicle 12 such that it, in one example, is roughly two-to-six meters in front of the coupler 14, and such that both the vehicle 12 and the trailer 16 have a similar heading angle. The system 10 may coach the driver, including by a message 91 displayed on HMI 40, as shown in FIG. 7. Once vehicle 12 is in position, the user may provide a continuous input to a "keep-alive" button 90 to indicate that the reversing maneuver is desired. System 10, by way of controller 26, controls the transmission system 92, powertrain throttle 73, steering system 20, and brake system 70. The system 10, utilizing such control, executes a low speed, reverse vehicle 12 motion to align the hitch ball 34 to the coupler 14. In an additional aspect of the system 10, as presently disclosed, may include or otherwise make use of a wireless communication module 94 within vehicle 12 for connection with an external wireless device 96. In various implementations, the wireless communication module 94 can include a wireless transceiver operating according to various protocols by corresponding circuitry and components. Such protocols can include, but are not limited to, Bluetooth®, WiFi, radio frequency ("RF"), and the like. System 10 and the device 96 are configured such that the user can manually drive the vehicle 12 into the above-described position, including with the same type of guidance by system 10, exit the vehicle 12, and then provide a motion command from the external wireless device 96. With the motion command delivered from the device 96, the vehicle 12 executes the reversing maneuver for alignment of hitch ball 34 and coupler 14 with the user outside of vehicle 12. In the system 10, as presently described, the HMI 40 is used as the main point of interaction between the user and the vehicle 12. In one aspect, the image processing routine 64 can be configured to detect and distinguish among one or more trailers 16 to the rear of the vehicle 12 with the user confirming or selecting the trailer 16 that is the desired target of the reversing maneuver via HMI 40. In such an example, the driver is required to be inside the vehicle 12 to make such a selection and can exit the vehicle 12 with the external wireless device 96 to complete the maneuver.

Figure 8:
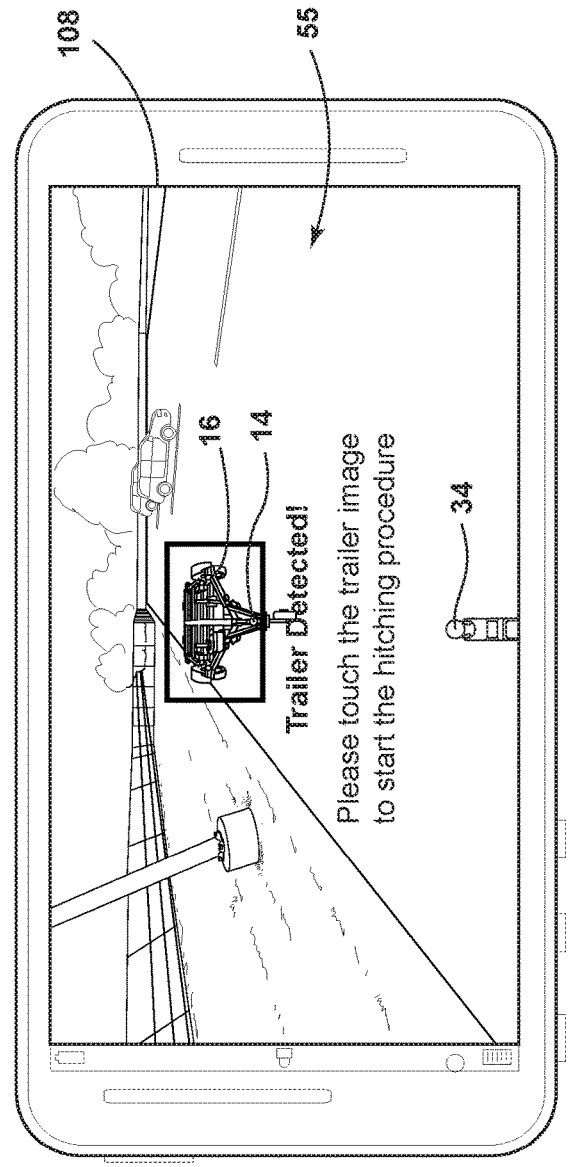
FIG. 8 is a depiction of a remote device in the form of a smartphone running an application in communication with the system to allow for remote system operation according to an aspect of the disclosure.

In one implementation, the external wireless device 96 can be a smartphone, as shown in FIGS. 1 and 8. The smartphone 96 can include memory 98 with an application 106 that facilitates communication of the smartphone 96 with the wireless communication module 94. In this manner, the smartphone 96, when running application 106 can, at the direction of system 10, requests the user input of the automated hitching initiation command, including by presenting a button or trailer indication 108 on the smartphone 96 screen 110 such that when indication 108 is touched by the user, system 10 executes the automated reversing maneuver. As shown, the smartphone 96 running the specifically-configured application 106 can provide additional information related to the status of the controller 26 in controlling the vehicle 12. In one aspect, this can include displaying the image data 55 from camera 48, for example in a way that replicates the display of the same via HMI 40. A further indication that the reversing maneuver is being executed can also be presented on screen 108 in various forms. The communication between the application 106 and controller 26 can be facilitated by wireless communication module 94 and smartphone 96 in various ways using available technology and communication protocols, including via Bluetooth®, ad-hoc WiFi, and the like. In this manner smartphone 96 can communicate with controller 26 to receive the image data 55 and to transmit user input.

Figure 9:
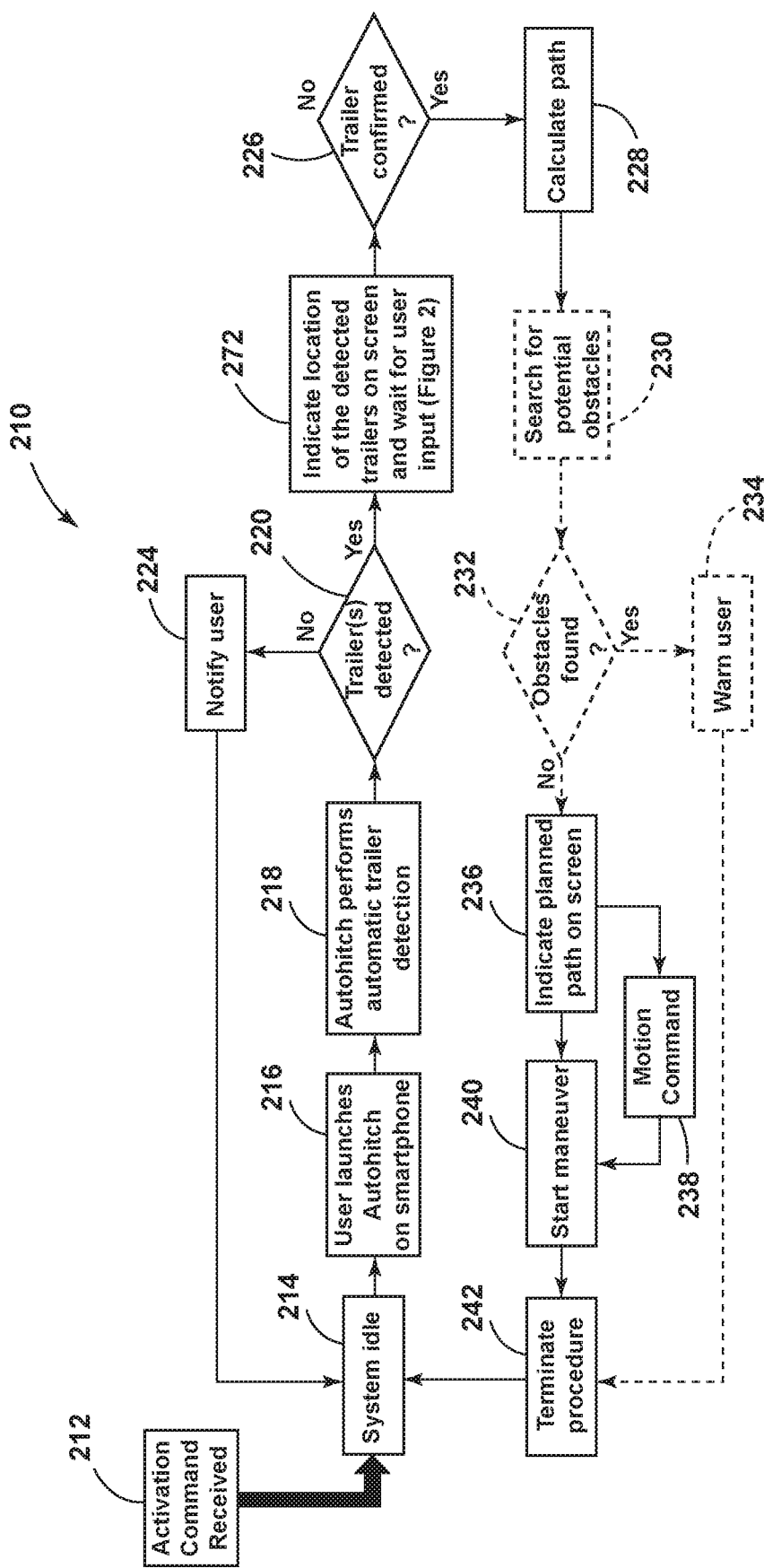
FIG. 9 is a flowchart depicting steps in a method for using a remote device for remote operation of the system.

Turning to FIG. 9, a flowchart depicting the general process for executing an automated reversing maneuver using the smartphone 96 depicted, for example, in FIG. 8, is shown according to a method 210 of the present disclosure. As shown, the controller 26 receives a system activation command (step 212) from the user via the HMI 40. System 10 then remains idle (step 214) until the automated hitching initiation command is received (step 216) from the smartphone 96, as discussed above. System 10 then receives scene data, including image data 55 and, optionally, radar data 100 (as discussed further below) of the area to the rear of the vehicle 12 from the detection system 104 and identifies the trailer 16 (or trailers 16) within the area to the rear of the vehicle 12 (step 218). If a trailer is identified (step 220), the location of the identified trailer(s) 16 can be displayed on the smartphone screen 108 (step 222) with the system 10 receiving a confirmation of the trailer and/or a selection of a desired trailer 16 from the user by interaction with the smartphone 96 screen 108 (step 224). If no trailer 16 is detected, system 10 can make an appropriate indication to the user (i.e. via screen 108) (step 226) and can wait while the user re-enters vehicle 12 and repositions it such that a trailer 16 can be subsequently located. After location and confirmation of a trailer 16, system 10 derives backing path 32, as discussed above (228). As optional additional steps, system 10 can scan the scene data to determine if any obstacles are found within the vehicle path 32 (step 230) and can make an indication of any obstacles, if found (step 232) to the user (step 234) so that the object or vehicle 12, as appropriate, can be moved. When an acceptable path 32 has been derived, the path 32 can be displayed on the smartphone 96 screen 108 (step 236) and the user can touch screen 108 in the area of the button or indication 110 (step 238) to command system 10 to begin the backing maneuver (step 240). When the maneuver is complete, system 10 can end the operating routine 68 to terminate the process (step 242), including by deactivating the powertrain control system 72.

Figure 10:
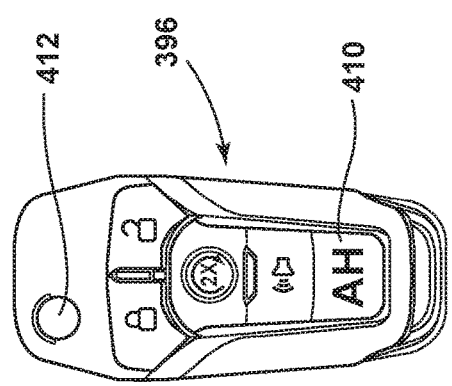
FIG. 10 is a depiction of an alternative remote device for use in controlling the remote operation of the system.

Turning to FIG. 10, in an alternative implementation, the external wireless device can be a key fob 396 that can similarly be configured for wireless communication with the wireless communication module 94, such as by RF communication or the like, and including a button 410 that can cause key fob 396 to transmit the automated hitching command to controller 26 when depressed by a user. In this implementation, a smartphone 96 is not required for use of system 10 outside of vehicle 12, thereby simplifying use while still delivering two-way acknowledgment for execution of the operating routine 68. In addition to the inclusion of the activation button 410, key fob 396, in one example, can include a lighted element 412 exposed on a portion thereof (i.e., by being mounted within an opening on the outer housing of the fob 396). The lighted element 412 can be in the form of a light-emitting diode ("LED") and, in a specific example discussed below, can be capable of illumination in multiple colors. In connection with such a key fob 396, the controller 26, within image processing routine 64m can be configured to identify the lighted element 412, when illuminated, in the scene data (i.e. image data 55), and to associate the position of the lighted element 412 with the position 28 of the coupler 14 of the trailer 16 for use in deriving the backing path 32.

Figure 11:
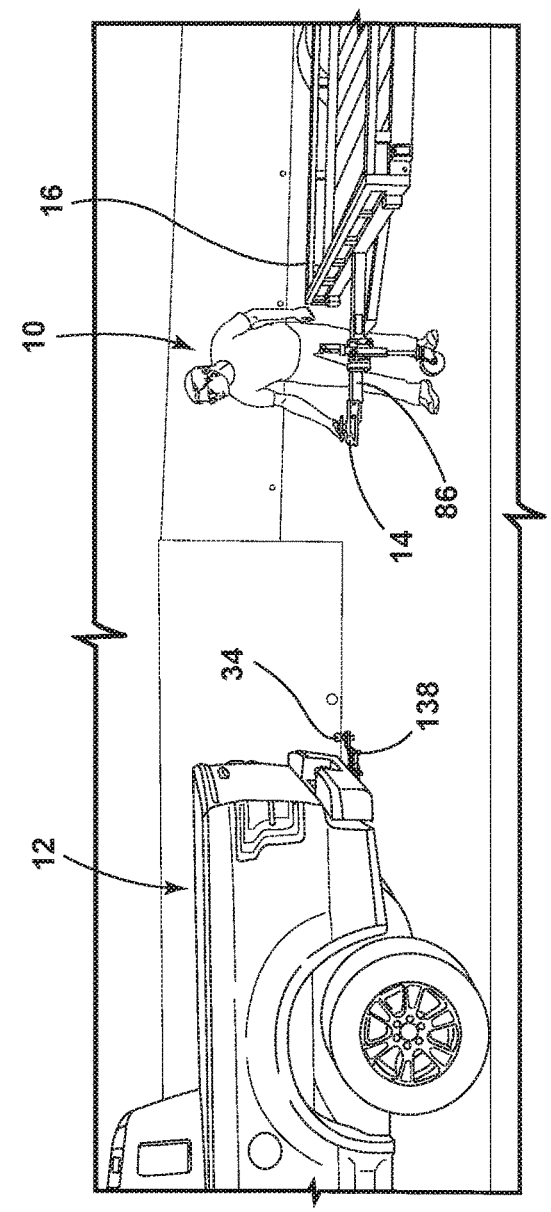
FIG. 11 is a side view of a user controlling remote operation of the system in backing a vehicle into alignment with a trailer using the remote device of FIG. 10.

As shown in FIG. 11, the user U can hold the key fob 396 over the desired alignment position (i.e., generally centered over coupler 14). The image processing routine 64 can then be used by system 10 to detect the lighted element 412, to determine the coupler 14 position 28. In one aspect, the user can depress button 410 when key fob 396 is positioned, as desired, on coupler 14, at which point the lighted element 412 can flash in a predetermined color, such as red, with image processing routine 64 configured to identify a flashing red light. The red flashing of lighted element 412 can also serve as an indication to the user U that system 10 is not yet ready to execute the backing maneuver. Once the lighted element 412 is identified, and path 32 is derived, the controller 26 can signal to key fob 396 to change the illumination of the key fob 396 to green to indicate that the trailer 16 indicated by the user U was correctly identified by the system 10 and that the system 10 is ready to start the backing maneuver. If system 10 cannot identify the lighted element 412 after, for example, a timeout period, the key fob 396 can cause the lighted element 412 to illuminate constantly in, for example, red to indicate that the detection was unsuccessful. If confirmation is given, the user can move key fob 396 from the position on coupler 14 while keeping button 410 depressed to signal to system 10 that the reversing operation should be executed. In an extension of such a scheme, the user could make also use of the key fob 396, by the above technique, in parking scenarios, where the key fob 396 can function as a "summon switch", which the user can use to direct the vehicle 12 into a garage, parking space, or the like.

Returning to the smartphone-based implementation of system 10, described above, as shown in FIGS. 12-14, the application 106 can be further configured, in cooperation with controller 26 to display a graphic representation of at least one desired range of user locations 114a,114b relative to the vehicle 12. The user location representations 114a, 114b can further be presented in connection with a message 116 directing the user to maintain a position at least approximately within the actual physical areas corresponding with representations 114a,114b during maneuvering of the vehicle 12 including reversing along the backing path 32. In particular, the location representations 114a,114b can correspond with desired viewing zones for the user U to observe the vehicle 12 as it approaches trailer 16, without the user being positioned directly between vehicle 12 and trailer 16, such as when vehicle backs along path 32. More particularly, the location representations 114a,114b may correspond with areas where the user can visualize the hitch ball 34 as it approaches coupler 14. This may allow the user U to monitor the progress of the hitching operation, as discussed further below.

Figure 12:
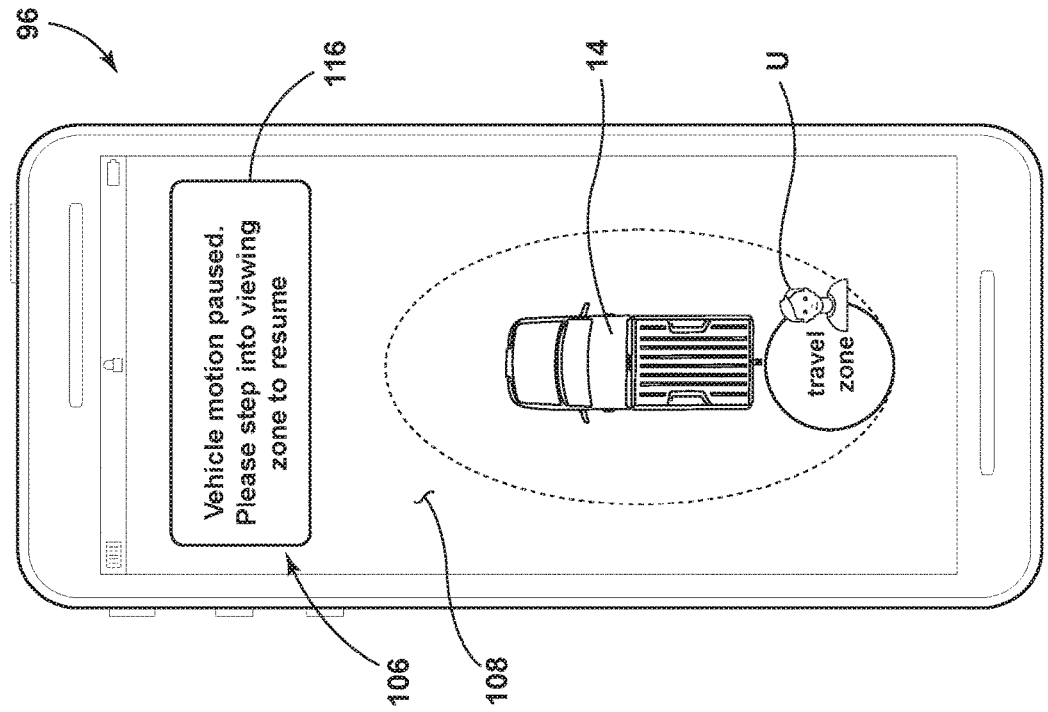
FIG. 12 is a depiction of a smartphone running an application configured to coach a user into an acceptable viewing zone during remote operation of the system using the smartphone.
Figure 13:
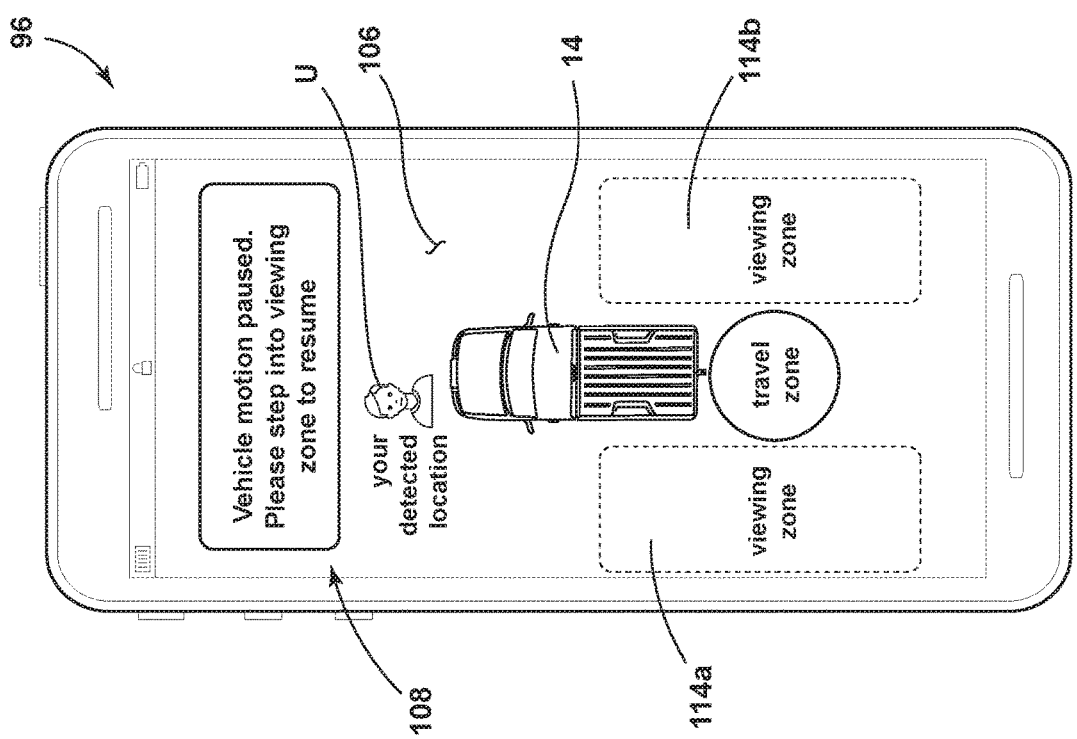
FIG. 13 is a depiction of the smartphone running the application of FIG. 12 and notifying the user of positioning in an unacceptable viewing location.

Using various methods to locate the user U relative to the vehicle 12, the system 10 can determine or estimate whether the user U is actually in a suitable location for monitoring the progress of the hitching operation. As shown in FIG. 12, the system 10 can present a representation of the user U in an approximate location of the user U relative to the vehicle 12 and the location representations 114a,114b. The above-mentioned message 116 can also be presented to correspond with a condition reflected by the detected position of the user U. In the present example, the message 116 can indicate that the user U has been determined to be outside of the viewing area, and can further indicate (as applicable based on system 10 functionality) that the operation has been paused until the user U is in one of the designated areas corresponding with the location representations 114a,114b. Similarly, as shown in FIG. 13, the message 116 can also be used to indicate when the user U is in a viewing area that is not acceptable, such as by being positioned behind vehicle 12 (so as to potentially be within the path of vehicle 12).

The particular scheme used to detect the position of the user U can depend on the particular configuration of system 10. In various examples, and as discussed above, the remote device used to control system 10 operation can be smartphone 96, key fob 396, or some other device. Depending on the device and its connection capability/protocol, remote device localization methods could include time-of-flight (associated ultra-wide band ("UWB") communication protocols), Wi-Fi, Bluetooth Low Energy ("BLE"), low frequency ("LF") signal strength, BLE signal strength, BLE angle of arrival ("AoA"), or dead reckoning. Additionally or alternatively to the image presented on smartphone 96 screen 108, shown in FIGS. 12 and 13, if the system 10 estimates that the user U is outside of the position(s) associated with location representations 114a,114b, the system 10 may provide an audible indication on smartphone 96 (including a tone, other predetermined sound, or a voice instruction), flash the rear vehicle 12 lights, honk the vehicle 12 horn, present audible indications via vehicle 12 (such as the chirps associated with remote vehicle locking, etc.), and decrease the vehicle 12 speed (including stopping the vehicle 12 completely). In various aspects, the particular action can be taken based on thresholds associated with a user U distance away from the desired viewing area and/or the user's position with respect to the rear of the vehicle 12.

Figure 14:
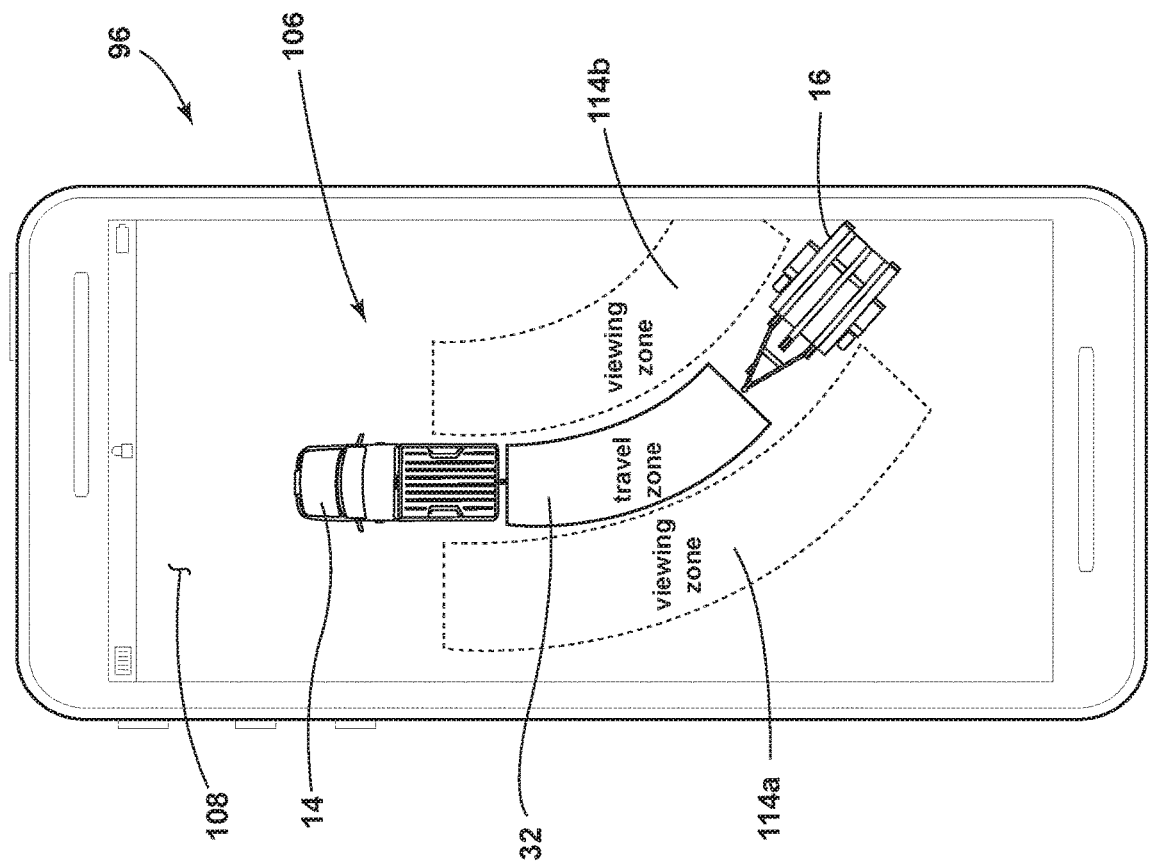
FIG. 14 is a depiction of the smartphone running a variation of the application configured to coach a user into an acceptable viewing zone during remote operation of the system using the smartphone.

As shown in FIG. 14, the location representations 114a, 114b can be determined based on the known or estimated length of trailer 16, as well as the predicted path 32 along which vehicle 12 will be backed during the hitching operation. In situations where the trailer 16 dimensions and configuration have been previously stored by the vehicle 12 or can be detected by system 10 including by using the selected remote device, the system 10 may project the location representations 114a,114b along the path 32 (which may be extended to a travel zone representation 118) around the trailer 16 depiction. The location representations 114a, 114b may assume a user U height and posture or may be adapted based on estimated user U height or posture. For example, the user height may be estimated from personalization information such as seat and mirror preferences. In another example, the user height may be estimated using vehicle 12 and/or smartphone 96 sensors to detect the height of the eyes of the user. In implementations where the remote device does not have a display 108 (such as when key fob 396 is used), a similar image to that which is depicted in any of FIGS. 12-14 can be displayed on the vehicle HMI 40 screen 44 upon system 10 activation, such that the user U can observe the location representation 114a,114b prior to exiting vehicle. In various implementations, the user may be provided with a view of the area surrounding vehicle 12 that may otherwise be obstructed by the vehicle 12 and/or trailer 16 by way of system 10 wirelessly transmitting image frames from the camera to the remote device 96. In various aspects, additional remote views from various ones of the cameras 48,50,52a,52b, which may be overlaid with the location representations 114a,114b, for example, in the form of augmented reality viewing zones may. These zones may be merged and/or based on the location representations 114a,114b described above.

Figure 15:
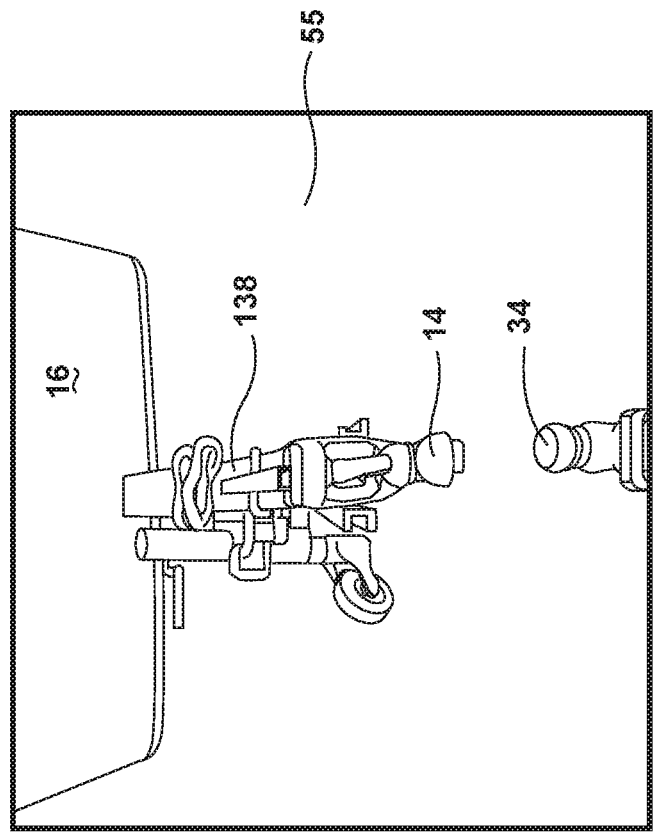
FIG. 15 is a depiction of an application interface image presentable in connection with an instruction for a user to check a height of a trailer coupler relative to a vehicle hitch ball during remote system operation.
Figure 16:
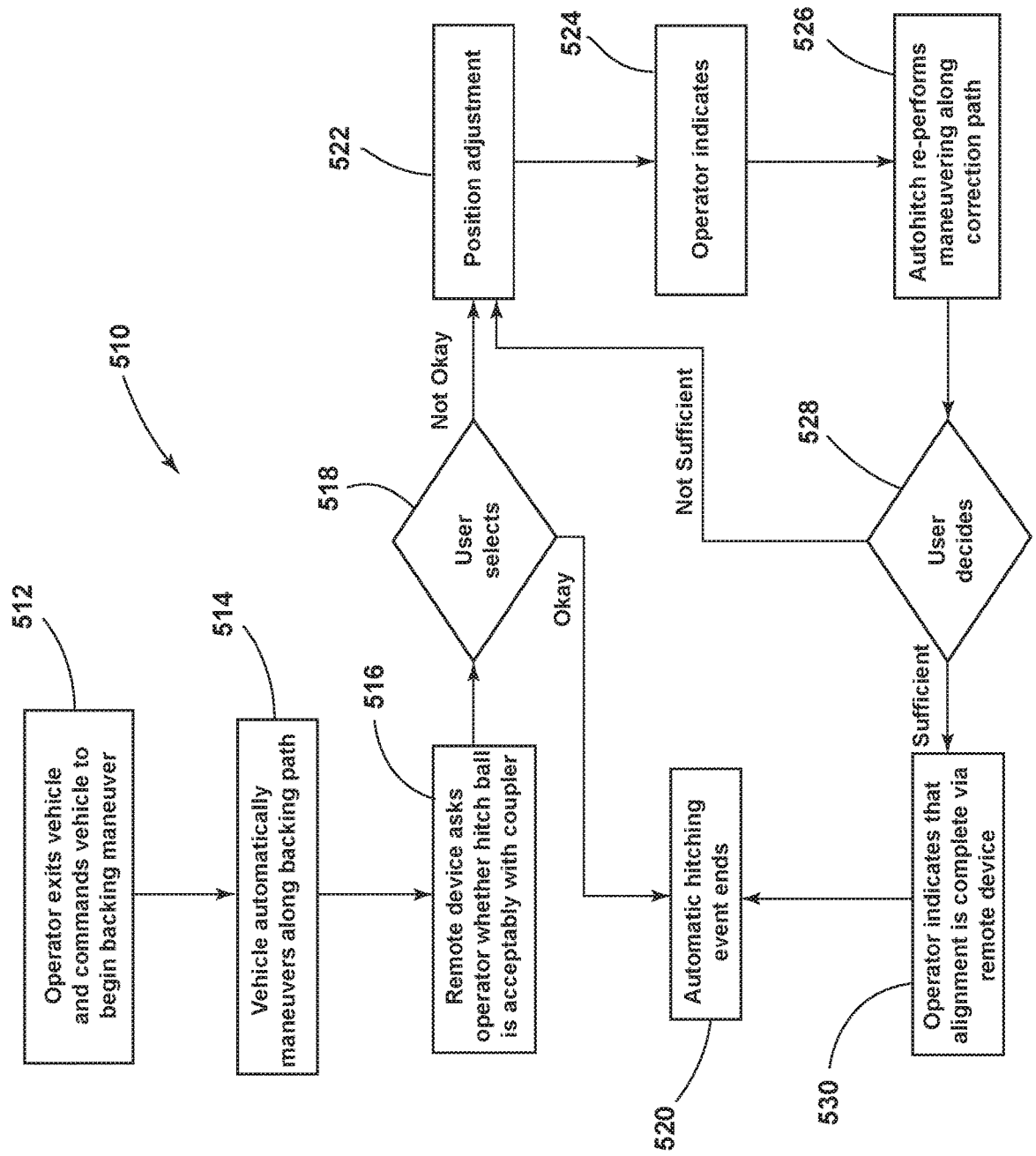
FIG. 16 is a flowchart depicting steps in a method for adjusting a final position of a vehicle hitch ball relative to a trailer within additional portions of the remote system operation.
Figure 17:
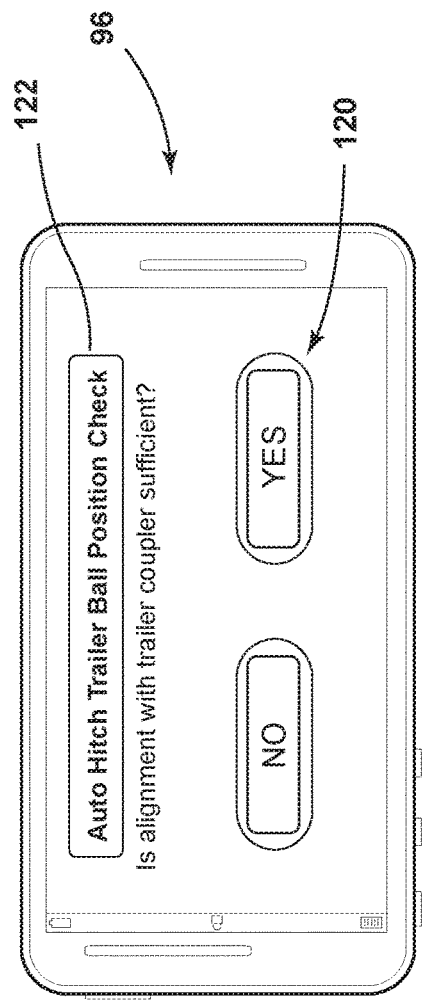
FIG. 17 is a smartphone running a variation of the application with an alignment interface.

Turning now to FIG. 15, in another aspect of system 10, controller 26, while controlling the backing maneuver of vehicle 12 along the backing path 32, may determine that hitch ball 34 is within a threshold distance of the coupler 14 and pause for user confirmation that a height of the coupler 14 relative to the hitch ball 34 is acceptable before continuing maneuvering the vehicle 12 including reversing along the backing path 32 to vertically align the hitch ball 34 with the coupler 14.

Figure 18:
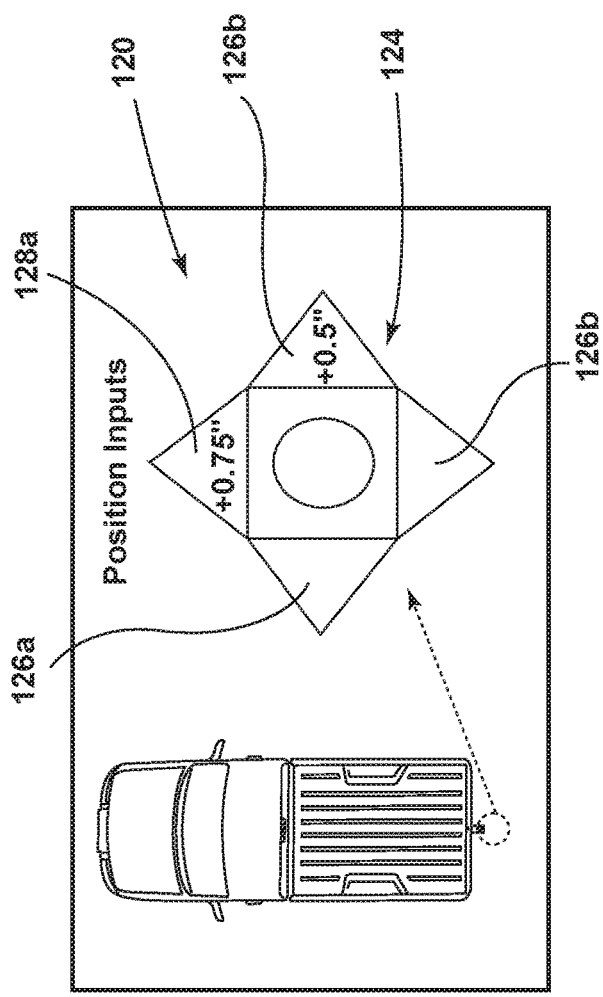
FIG. 18 is an implementation of the alignment interface providing for input of alignment direction and distance.
Figure 21:
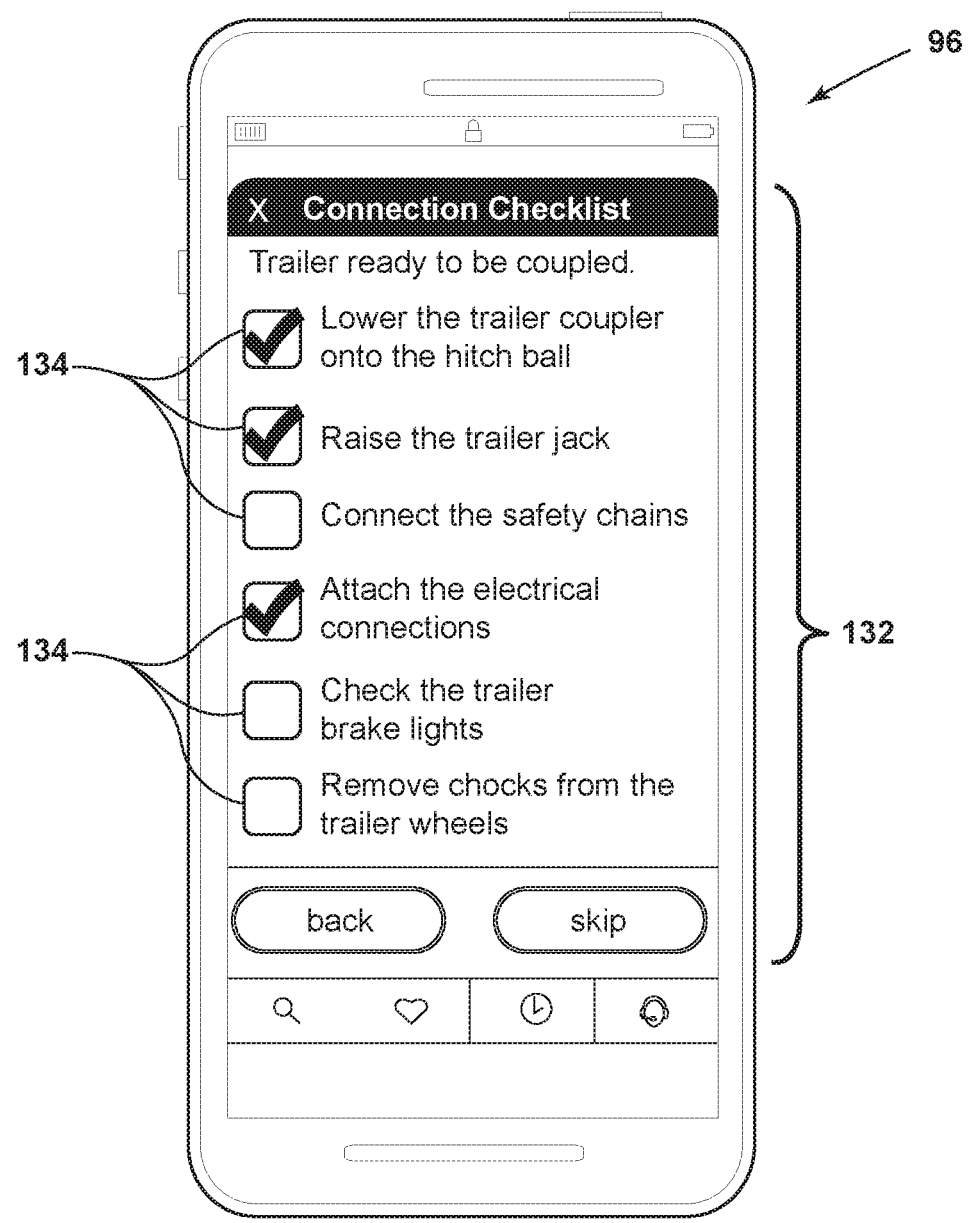
FIG. 21 is a smartphone running a variation of the application with a system checklist interface.

With reference to FIGS. 16-21, in various aspects, when controller 26 determines that a backing maneuver is complete, the controller 26 can be configured to further receive a user indication, by way of remote device 96, of a direction and distance of any misalignment between the hitch ball 34 and the coupler 14 along the driving plane (i.e., in a direction parallel with the ground surface). Using this data, the controller 26 may derive a correction backing path 32 to realign the hitch ball 34 with the coupler 14 based on the user indication. The controller 26 may then control the vehicle 12 steering system 20 to maneuver the vehicle 12 to reverse vehicle 12 along the correction backing path (which may appear generally similar to backing path 32, executed over a generally smaller distance). As shown in FIGS. 18 and 19, for example, such functionality may be associated with the presentation of an interface 120 on the remote device, for example on smartphone 96, that allows the user to indicate the amount of alignment adjustment that is needed and command the vehicle 12 to perform an additional maneuver to correct the misalignment.

As discussed above, smartphone 96 includes memory 98 encoded with application 106 that facilitates communication of the smartphone 96 with the wireless communication module 94 of vehicle 12. In this arrangement, controller 26 receives the user indication of misalignment via the wireless communication module 94 from the smartphone 96. Referring back to FIG. 17, a logic diagram is presented that shows steps in a method 510 for operating system 10 using smartphone 96 that includes the above-described realignment functionality. From an initial condition, where vehicle 12 is within a valid range of the trailer 16 (such as within the view of rear camera 48 and within a predetermined distance from vehicle 12) and the vehicle 12 is in park, in step 512 the user exits vehicle 12 and closes the driver door. The user then provides a motion command via smartphone 96 interface 120 (step 514). Once the activation command is received from the user via smartphone 96, system 10 maneuvers vehicle 12 along backing path 32 (step 516), as discussed above with respect to FIGS. 3-6 until vehicle 12 reaches endpoint 35 of path 32. Once the system 10 determines that vehicle has reached the endpoint 35 of path 32, the system 10, via the interface 120 on smartphone 96 prompts the user to indicate if the hitch ball 34 is aligned with the coupler 14 such that the backing maneuver can be considered complete (step 520). If, in response to such prompt 122 (FIG. 18), the user determines that the hitch ball 34 is sufficiently aligned with the coupler 14, and makes a selection (step 518) to confirm such acceptable alignment on interface 122 of smartphone 96. After such positive confirmation, the process ends (step 520) and system 10 maintains the position of vehicle 12 to give the driver the opportunity to hitch the trailer to the vehicle 12 before re-entering vehicle 12.

If, in step 518, the user determines that the hitch ball 34 is not sufficiently aligned with the coupler 14 to allow for lowering the coupler 14 onto the hitch ball 34 directly, and selects the appropriate option on prompt 122, the system enters a position adjustment mode 322, including by presenting an adjustment interface 124 according to one of the various examples of FIGS. 18-20. By way of such interface 124, the user enters measurements, as needed in the lateral direction 126a,126b and the longitudinal direction 128a, 128b, to move the hitch ball 34 into closer alignment with the coupler 14. In the example of FIG. 19, the interface 124 uses arrows for the lateral 124a,124b and longitudinal 126a,126b directions with each selection of such arrows corresponding with a predetermined distance increment for the desired realignment (for example 0.25"). As shown in FIGS. 19A and 19B, the realignment input 124 can, alternatively, be presented as a 2-D representation of the overhead view of the hitch ball 34 with the interface 120 instructing the user to drag the hitch ball 34 representation by an amount approximating the movement of hitch ball, by way the realignment process, needed to align to align the hitch ball 34 with coupler 14. Returning to FIG. 17, when the realignment direction(s) and value have been received from the user via smartphone 96 (step 522), and the user confirms (also via the interface 120 presented on smartphone 96) that the system 10 can move the vehicle 12 again (step 524), controller 26 can perform a correction maneuver along a recalculated path 32. In one example, controller 26 can cause vehicle 12 to move forward (such as along a straight forward path) by an amount sufficient to achieve any needed lateral realignment before reversing vehicle along a recalculated path 32 with an endpoint 35 determined to align hitch ball 34 with coupler 14. In other examples, controller can execute one or more "nudges" of vehicle 12 in the forward or rearward direction to correct a misalignment condition that only includes forward or backward misalignment. When the realignment maneuver is complete, the alignment prompt 122 (FIG. 18) is presented again to the user, with the user deciding if the alignment of hitch ball 34 with respect to coupler 14 has been acceptably corrected (step 528). If the alignment is acceptable, (step 530), the hitching process ends (step 520). If further realignment is needed, system 10 re-executes steps 322-326 until a sufficient alignment is achieved. In an alternative realignment scheme, controller 26 can cause smartphone 96, via application 106, to present an interface 120 shown in FIG. 20, wherein the user is asked to swipe along arrows 124 or 126 in the direction in which realignment is needed. In response to a user swipe, the controller 26 causes vehicle 12 to move by a predetermined amount e.g. 1-3 cm in the indicated direction, until the user determines that realignment has been successful.

In a further alternative arrangement, system 10 can be configured to detect various interactions with vehicle 12 by user U. In this respect, the controller 26 can leverage connection with the various vehicle sensors included in detection system 104, proximity sensor array 54, and additional sensors (such as the door sensors, touch, or acoustic sensors strategically positioned along vehicle 12, or the like), to receive a user indication of, for example the user being ready for system 10 to begin an automated backing maneuver or the need to attempt vehicle 12 realignment, in the form of one of a voice command or a physical vehicle 12 interaction. In one aspect, upon an automated hitching maneuver being completed with the driver inside vehicle 12, the driver can exit the vehicle to lower the trailer tongue 86 for engagement of the coupler 14 with the hitch ball 34. If, however, sufficient alignment has not been achieved, the user can provide feedback to the system 10 while still outside of the vehicle 12. This can including indicating a direction for vehicle 12 nudging by controller 26 to correct the alignment. This can be done with the driver remaining outside of the vehicle 12 with the vehicle, upon receiving indication, pulling forward slightly and reversing again to reach an alignment that is slightly shifted from the original alignment in the direction indicated by the user. If another nudge is needed, the user can repeat the process until the alignment is acceptable before connecting the trailer 16. The particular interaction used to indicate that the alignment is not sufficient can includes, but is not limited to, a number of examples. In one such example, the tailgate handle 130 (FIG. 1) can include a sensor in communication with controller 26 such that the user can pull on the tailgate handle 130 a set number of times to indicated misalignment to the left and a different number to indicate misalignment to the right. In another example, system 10 can be programed to interpret or identify prescribed gestures that image processing routine 64 can identify in the image data 55 received from imaging system 18. For example, if the driver points left, it could indicate to controller 26 that vehicle 12 needs to be nudged left. Controller 26 can continue to monitor the image data 55 during the connection phase of the automated hitching maneuver to determine if any additional nudges are needed. In a still further example, the key fob 396 can be used, via various predetermined ones of the buttons thereon in, for example, a specific combination of key presses, to indicate that a nudge in a specific direction is needed. In a final, non-limiting example, vehicle 12 can be equipped with an external microphone such that speech recognition can be utilized by controller 26 to nudge vehicle 12 to the right or the left based on verbal commands from the user. Upon the receipt of the nudge request from the user, the system 10 can then indicate to the user that the command has been received and that vehicle 12 will be automatically moved, which can be done through the emergency flashers, or through the horn, or other such visual or auditory functions.

In a further aspect, system 10 can be configured to utilize information obtained during the realignment process 310, including the alignment correction command (direction and distance) received from the user to interpret the error that occurred in original alignment. This error can then be saved into the system 10 memory 62 for future use in attempting to correct such errors, including when similar conditions are recognized. In this respect, system 10 can capture the trailer 16 properties, GPS coordinates and orientation of the vehicle 12 and trailer 16 during the automated hitching maneuver. Using this information, system 10 can implement specific geographically relevant calibration factors. For example, the misalignment may be different on flat pavement compared to a rocky ground surface, on a hill or other inclined setting, or the like. In subsequent automated hitching maneuvers performed in the same or similar location and/or orientation, a derived calibration factor can be utilized by path derivation routine 66 in an attempt to reduce or eliminate the error.

In a further aspect, system 10, including the application 106 stored on and executed by smartphone 96 can be configured to help minimize instances of the diver exiting and entering the vehicle 12 by including a connection interface 132 that allows the driver to turn off the vehicle 12 powertrain system 72 from outside the vehicle 12. As discussed previously, there are several steps that are to be manually completed by the user to secure the trailer 16 to the vehicle 12 after completion of the automated backing maneuver. To assist the user in completing these tasks, when controller completes the process of aligning the vehicle with the trailer, it can transmit an indication of the alignment state to smartphone 96, which can then display, via interface 132, a dynamic checklist to remind the user of the steps that need to be completed to prepare the trailer 16 for towing by vehicle 12. In interacting with the interface 132, the user can tap particular items 134 on the checklist to toggle its completion status. In some aspects, the status of some items 134 can be detected by the vehicle 12 and/or smartphone 96.

In a further aspect, controller 26 can leverage the connection with the remote device in the form of smartphone 96 camera 136 to collect additional information relevant to the automated hitching maneuver conducted with respect to a specific vehicle 12 and trailer 16 configuration. In particular, remote device 96 can be used to acquire and store relevant dimensions of portions of both trailer 16 and vehicle 12 in the a part inventory stored in one or both of the smartphone memory 98 or controller memory 62 such that the information can be provided to system 10 use in the image processing 64, path derivation 66, and operating 68 routines. In one aspect, many specific hitch balls 34 and ball mounts 138 (FIG. 1) are sold together as a single item and imprinted or otherwise marked with a manufacturer model number. Such a model number can be detected by the application 106 running on the remote device 96 using image data received from the camera 132 or can be entered into the remote device 96 manually by the user. Similar detection and/or entry can be done separately in instances where the hitch ball 34 and mount 138 are separately acquired components. When identified or entered, the model number can be used to lookup the dimensions of the corresponding item (hitch ball 34, ball mount 138, or combination) in a database. At least one of the remote device 96 or the controller 26 can use image processing on the image data obtained from smartphone camera 136 to substitute or augment information received such a database. In one example, the dimensions of one of the components (e.g. hitch ball 34 or ball mount 138) can be looked up in a database and used to calculate the dimensions of the entire hitch ball 34 and ball mount 138 assembly using image processing techniques such as pattern recognition. For example, the hitch ball 34 diameter may be known from a database and retrieved through model number identification or entry, while the ball mount 138 may be identified using pattern recognition. In the remote device 96 image data, the ball mount 138 dimension (e.g. the length thereof) may be represented as a percentage of the hitch ball 34 dimensions (e.g., height and/or diameter) and may be, accordingly, calculated. In one example, the remote device may process the image data (from a still image or a series of image frames in video data) and transmit the dimensions to controller 26. In another example, the image data may be transmitted to the controller 26 for processing. In further examples, the remote device 96 may be configured to detect if a drawbar/ball mount 138 extension is used and can prompt the user to enter the part number, dimensions, or take an additional picture (if needed) with the remote device 96 camera 136. In a similar example, the remote device may be able sense or identify the orientation of a multi-ball mount and transmit the active diameter (i.e. of the hitch ball 34 in the upward position), as the hitch ball 34 height and position relative to the other ball sizes may be known or otherwise ascertainable for a particular part within a database. Once the relevant hitch ball 34 component dimensions are transmitted to the controller 26, for example, from the remote device 96, they may be added to known vehicle constants in memory 62 in order to determine the hitch ball 34 location 38 with respect to vehicle 12.

Figure 22:
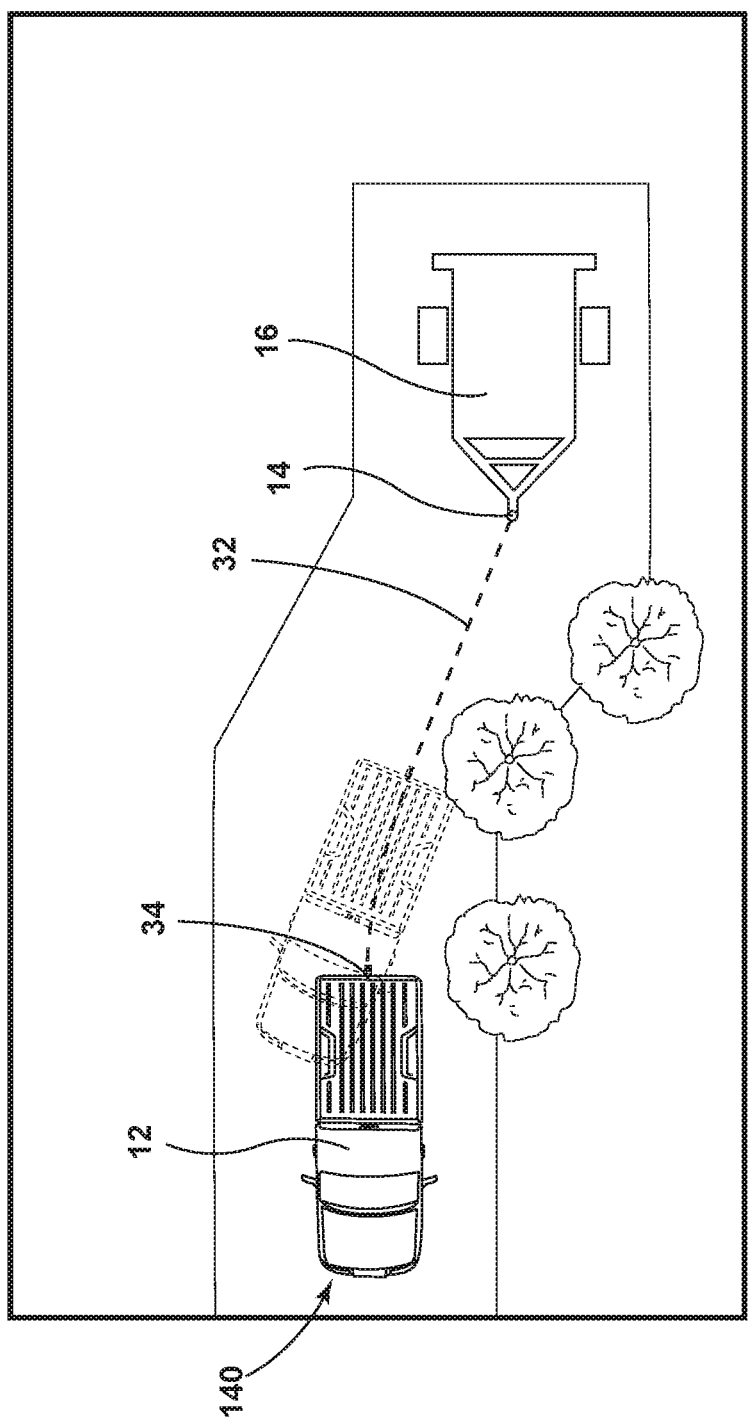
FIG. 22 is a schematic depiction of a variation of the system executing remote system operation to align a vehicle with an out-of-view trailer.
Figure 23:
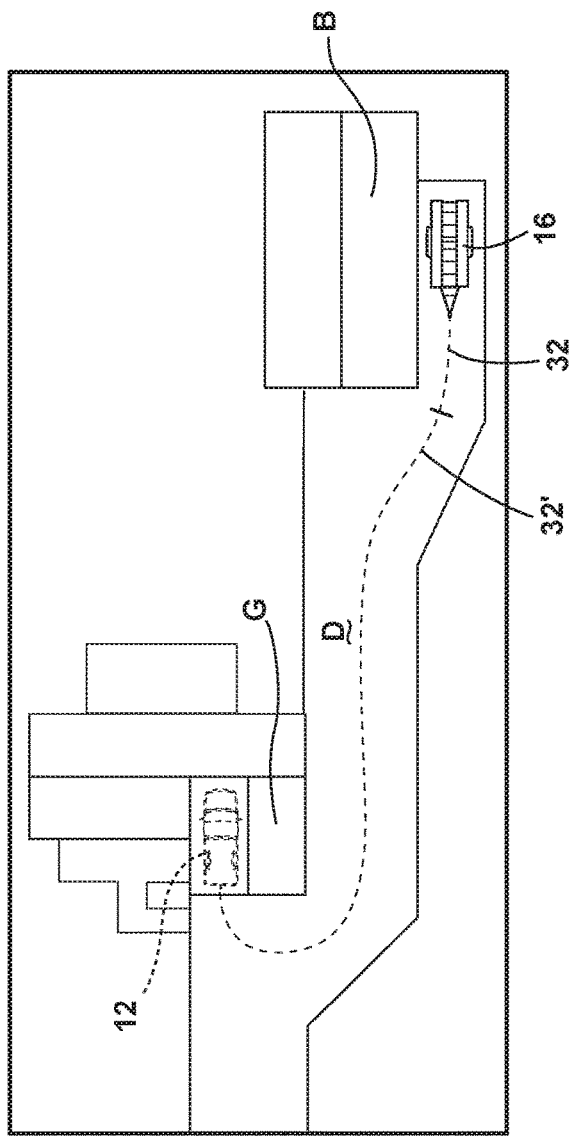
FIG. 23 is a schematic depiction of the variation of the system executing remote system operation to align a vehicle with an out-of-view trailer with a location stored in memory.

Turning to FIGS. 22 and 23, a further aspect of system 10 may allow for execution of an automated hitching maneuver under the control of the user by way of remote device 96 from a position where trailer 16 is not initially within the line of sight of the vehicle 12 cameras 48,50,52*a*,52*b* and/or when a typical path obtained from path derivation routine 66 may be obstructed or otherwise non-ideal. In one aspect, as shown in FIG. 22, a driver may park trailer 16 in a location from which the driver can navigate away, and which is generally reachable by the vehicle 12 in a subsequent hitching operation. Such a location, however, may result in an object O being positioned within the path of vehicle 12 when reversing on a path 32 generated by path routine 68. In some instances, the path routine 68 may be configured to identify object O using image data 55 and to adjust the backing path 32 accordingly (and further to maintain vehicle 12 on the same driving surface S on which both vehicle 12 and trailer 16 are positioned). In another aspect, according to an embodiment of the system 10 of the present disclosure, system 10 can be configured to interpret the environment around the vehicle, using a combination of available sensors, such as cameras 48,50,52a,52b, radar 102, and proximity sensor array 54. System 10 can use the sensor information to generate and save an environmental map of the area surrounding the trailer 16. In one aspect, this map can be used in path derivation routine 66. In a further aspect, the environmental map and other information can be used in navigating vehicle 12 under control of controller 26 from a position that would otherwise be unacceptable for use of the image processing 64 and path derivation 66 routines (such as when trailer 16 is not in the field of view 49 of camera 48 or when trailer 16 is out of an acceptable range, either laterally or longitudinally, of vehicle 12). In this respect, system 10, thusly configured, can be used to localize the vehicle 12 position within the saved environmental map associated, for example, with a particular trailer 16, using additional sensors such as wheel speed 100, yaw rate 58, and linear acceleration sensors 56, along with positioning system 22.

In one implementation, system 10 can be configured to store or otherwise track the location of multiple trailers 16 associated with vehicle 12. This can be accomplished by storing a particular trailer 16 location, including through user interaction (e.g. the user can manually save the location), or by interpreting the location based on vehicle 12 behavior during a drive cycle. For example, if the vehicle 12 is towing trailer 16, and system 10 detects that the trailer 16 is subsequently disconnected, system 10 can assume the has been unhitched and left in the position at which the unhitching is detected. System 10 can then save that trailer 16 location in memory 62 for recall in a later hitching operation. Using such information, the path derivation routine 66 can derive a path 32' from an initial position of vehicle 12 position to or toward the saved location of the trailer 16. Controller 26 can then control the vehicle 12 to follow that path 32' back to the general location of the trailer 16. In one aspect this initial portion 32a' can be done using an adaptation of path derivation routine 66 that accounts for the environmental map data and substitutes the stored trailer location for a detected trailer location. In another aspect, controller 26 can further associate path 32' with the saved trailer 16 location based on the path taken by vehicle 12 as it drives away from trailer 16 after unhitching (i.e., when the trailer 16 location is saved). Under this scheme, path 32' can be based on a reversing maneuver along the path taken by vehicle 12 as it drives away from the stored trailer 16 location. In one aspect, the path 32' can be generated automatically and saved after unhitching is detect. Alternatively, system 10 can confirm a trailer 16 location and path 32' when vehicle 12 is stopped after driving away from an unhitching location. In a further aspect, the user may be given the option to adjust a stored path 32' using, for example the vehicle HMI 40. Further, controller 26 can capture a still image from image data 55 including the trailer 16, when the trailer 16 location is stored in memory 62, to present to the driver when confirming trailer 16 options during a hitching maneuver.

When the user initiates an automated hitching maneuver, controller 26, upon receiving the scene data (including image data 55 and radar data 100), may determine that no trailer is within the area to the rear of the vehicle 12. Controller 26 can then prompt the user to select a stored trailer 16 for hitching using the above-described extended functionality. In one embodiment, the user can select such a trailer 16 location using the vehicle HMI 40 or smartphone 96. When a trailer 16 is selected, controller 26 can control the vehicle 12 to completes an initial alignment maneuver by driving vehicle 12 along a portion of the saved path 32' to position the vehicle 12 relative to the trailer 16 such that the trailer 16 is within the area to the rear of the vehicle 12 and within an acceptable range such that trailer 16 and/or coupler 14 can be identified in the image data 55. Once trailer 16 is identified within the desired area to the rear of vehicle 12, controller can use the standard path derivation routine 66 and operating routine 68 to back vehicle 12 toward trailer 16 for alignment of hitch ball 34 with coupler 14 according to the processes described above (e.g., with respect to FIGS. 3-6 and/or FIG. 17). This functionality removes the need for the driver to pre-align the vehicle 12 in front of the trailer 16 before beginning an automated hitching operation. In implementations where the trailer 16 position can be selected using smartphone 96 (or another remote device), system 10 may be able to complete an entire hitching maneuver without the user being within vehicle 12. This functionality may also allow for use of system 10 to back vehicle 12 to a trailer 16 with a stored location in conditions where diminished detection of trailer 16 from image data 55 (e.g. low light or obstructed view from, for example snow, rain, or other weather conditions) would impact the usability of system 10, as described above.

Figure 24:
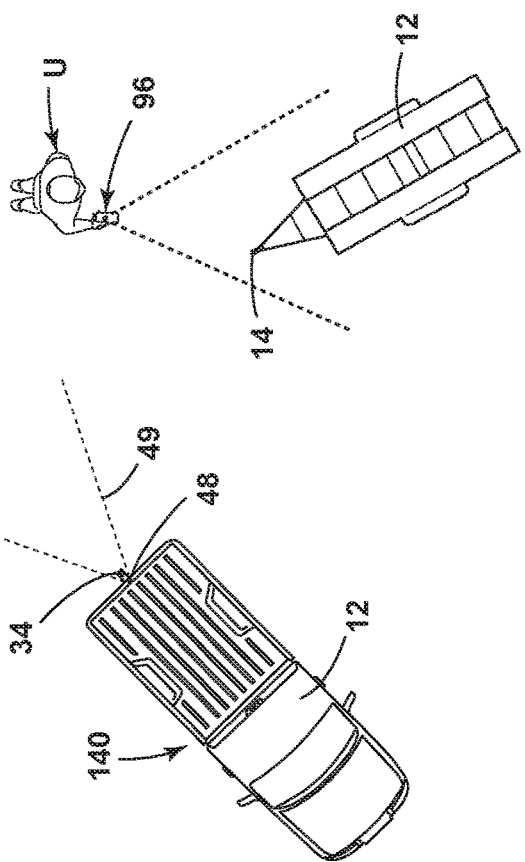
FIG. 24 is a schematic depiction of a further variation of the system executing remote system operation to align a vehicle with an out-of-view trailer using a smartphone interface and camera.

Further functionality according to the use of stored trailer 16 locations, along with environmental map and path 32' data is described with respect to FIG. 24. In the illustrated example, trailer 16 has been parked adjacent an outbuilding B and unhitched from the towing vehicle 12, which was then driven along driveway D to a garage G in which vehicle 12 is parked. If the driver wishes to have vehicle 12 moved into a position for hitching with trailer 16, the user can initiate the desired hitching process using the application 106 stored on smartphone 96, which may be wirelessly connected with controller 26 by way of an associated WiFi connection or the like. The user may open an option within the application 106 associated with a "remote" automated hitching procedure and may select the trailer 16 using, for example, a representation of the environmental map data presented on smartphone 96 screen 108 by application 106 (which may also confirm the location of vehicle 12 relative to trailer 16. Once confirmed, the user can select to initiate the hitching process and then controller 26 can drive vehicle 12 along an initial portion of path 32' (which may include both forward and backward driving) to move vehicle 12 out of the garage G and along the driveway D to a position where the standard automated hitching maneuver can successfully align the hitch ball 34 with the coupler 14 of trailer 16. As discussed above, this path 32a' can be based on the driving of vehicle 12 away from trailer 16 when the location thereof was stored in memory (62 and/or 98) and/or may consider sensor and map information, to, for example, navigate around the outbuilding B. As vehicle 12 approaches the trailer 16 location, the image processing routine 64 is activated, and begins searching for the actual trailer 16. Once trailer 16 is identified, path derivation routine 66 is executed and the hitching maneuver is completed by controller 26 moving vehicle 12 along the generated path portion 32.

In a variation of the above, system 10 may be configured to operate with a wireless device, such as a radio frequency transmitter, or Bluetooth device, that can be affixed with trailer 16. The wireless device can transmit or return a signal to smartphone 96 and/or controller 26 that can be used to identify and locate the associated trailer 16. As discussed above, the location can be stored in memory 62 or 98 and associated with a particular trailer 16. The movement of vehicle 12 to a position for hitching with trailer 16 can otherwise operate similarly to the process discussed above. Additionally, during operation according to any of the above examples, the remote device 96 can be configured to communicate to the user, the various hitching maneuver options, the progress of the selected and activated maneuver, and any system 10 errors that may occur during operation. There are additional functions that can be implemented by the remote device 96, particularly in the form of a smartphone running the above-described application 106. In one example, application 106 can offer the option to open and close a garage door, which can be implemented by controller 26 connection with an integrated opening system. Additionally, the system 10, as described herein can control an active suspension system of vehicle 12 to raise and lower the rear end of the vehicle 12, as needed, to allow clearance for hitch ball 34 to pass beneath coupler 14. Alternatively, an electrically assisted jack stand on the trailer 16 could be controlled by the application 106 to raise or lower the trailer coupler 14 to the desired height for vehicle alignment and hitching.

As shown in FIGS. 23-30, system 10 can be additionally or alternatively configured with ability to locate a trailer 16 relative to vehicle 12 when the location of the trailer 16 is not pre-stored in memory 62 or 98 such that an initial alignment maneuver can include determining a preliminary trailer position 140 and/or a preliminary coupler location 28' using data received from smartphone 96 via the wireless communication module 94. In this respect, data can be obtained by smartphone 96 by application 106 and transmitted to (and received by) controller 26 received from the external wireless device with such data including image data from camera 136 that can be used to identify the trailer 16 and/or coupler 14 relative to smartphone 96 (using image processing routine 64 in connection with known characteristics of camera 136). The data can also include location and heading data from the smartphone 96 relative to the trailer 16 and/or relative to the vehicle 12. As discussed further below, controller 26 can use this data to determine the initial trailer location 160 and or the initial coupler location 28' relative to vehicle 12 for movement of the vehicle 12 through an initial path 32' to place vehicle 12 in a position where the trailer 16 can be expected to be in the field of view 49 of camera 48 and in an acceptable range from vehicle for use of the standard image processing routine 64, path derivation routine 66 and operating routine 68 to align hitch ball 34 with coupler 14. In the example shown in FIG. 24, vehicle 12 may be parked at a suboptimal angle with respect to the trailer 16 (or too far away from trailer 16), but in a position where both the trailer 16 and the vehicle 12 are within sight of the user U. In such a scenario an automated hitching operation may still be initiated by the user U by way of smartphone 96 and the appropriately-configured application 106.

In one implementation, the application 106 may guide the user to take a photo of the trailer 16 and/or coupler 14 that is the desired subject of the maneuver. The guidance may include coaching the user U to stand within a predetermined distance of the trailer 16 and/or coupler 14 and, according to one option, to take the picture at the angle at which they wish the vehicle 12 to align to the trailer 16 when hitch ball 34 is aligned with coupler 14. Smartphone 96 can process the image obtained from the user U and the available sensor 142 data to determine the position and orientation of the trailer 16 relative to vehicle 12 (including through an intermediate determination of the position of smartphone 96 relative to vehicle 12 and trailer 1 relative to smartphone 96). The application 106 running on smartphone 96 can be configured to analyze the image obtained by camera 136 to identify trailer 16 features and dimensions using various image processing schemes, including but not limited to machine learning. The sensors 142 within smartphone 96 can include a GPS sensor, an accelerometer to detect movement of smartphone 96, and a gyroscopic sensor to detect rotation of smartphone 96. Additional localization capability can also be realized using approximate trilateration between cell phone towers with which smartphone 96 is in communication. As such, sensors 142 can be used for dead reckoning to determine the position and rotation of smartphone 96 relative to vehicle 12 (some smartphones may also be capable of Wi-Fi time of flight signal monitoring and Bluetooth® low energy angle of arrival signal detection for improved localization).

Additionally, the smartphone 96 running application 106 may be able to process the image to identify the relative angle of the trailer 16 about coupler 14 relative to smartphone 96 and, ultimately, vehicle 12. The smartphone 96 may also be configured to estimate the height of the trailer coupler 14 and the distance from the user U by processing the image from camera 136. As discussed above with respect to FIG. 15, the height estimate for coupler 14 can be used to coach the user to raise the coupler 14 as needed prior to initiation or finalization of the backing maneuver. The Remote Device may also send the coupler height to the vehicle so that the vehicle can automatically adjust the suspension height (if capable) to help complete the hitching process.

Figure 25A:
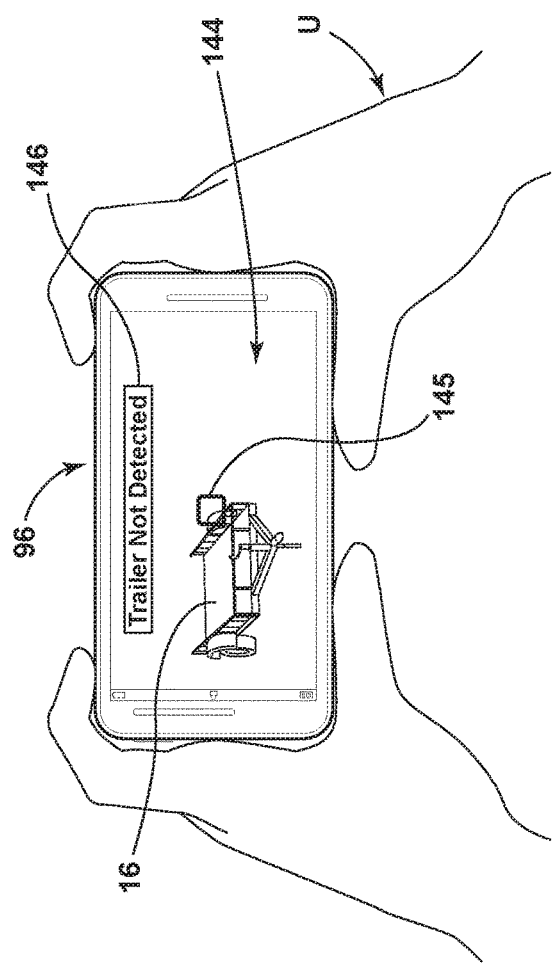
FIGS. 25A and 25B are depictions of the smartphone running an application with an interface for using the smartphone camera in determining the location of the trailer relative to the vehicle.
Figure 25B:
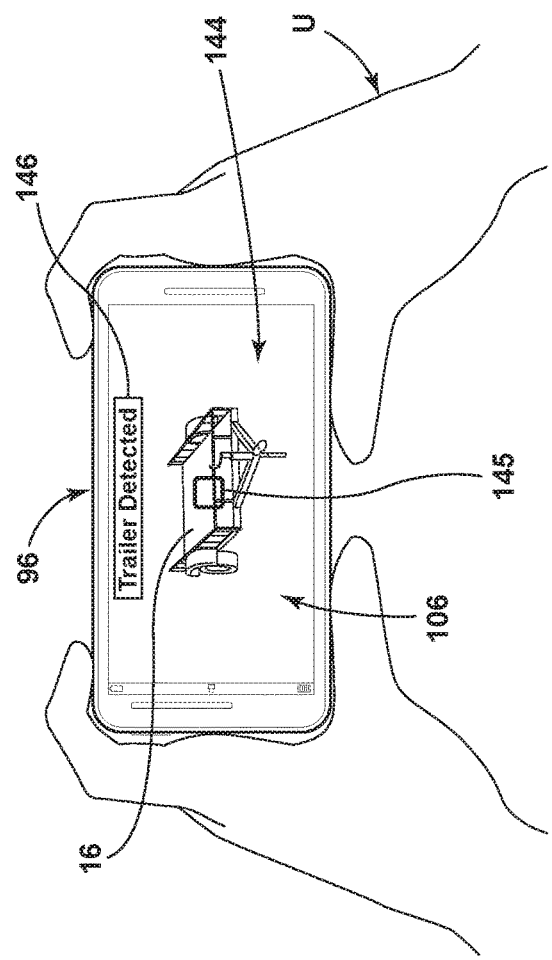
Figure 26:
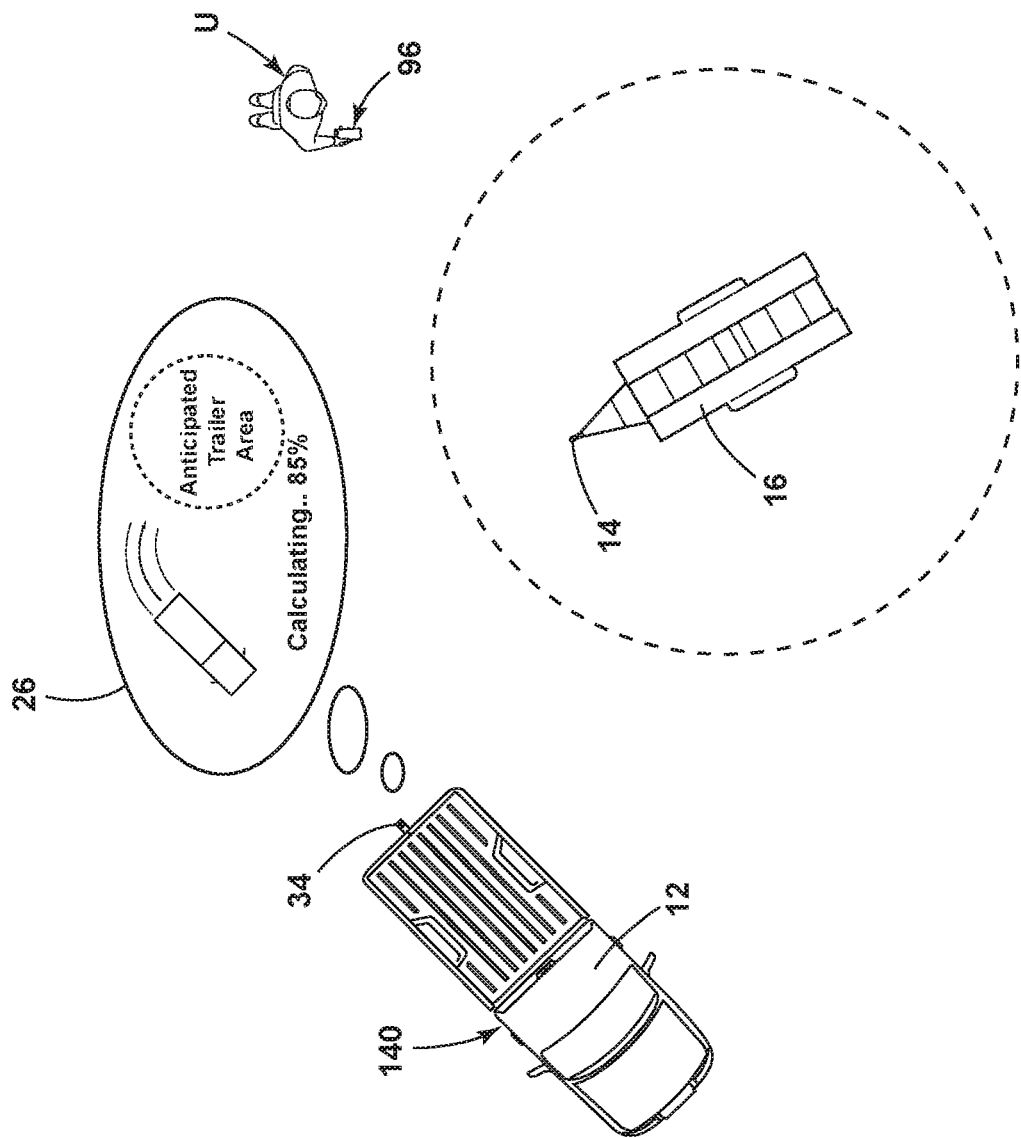
FIGS. 26-29 are schematic depictions of additional steps in the remote system operation to align the vehicle with the out-of-view trailer using the smartphone interface and camera.
Figure 27:
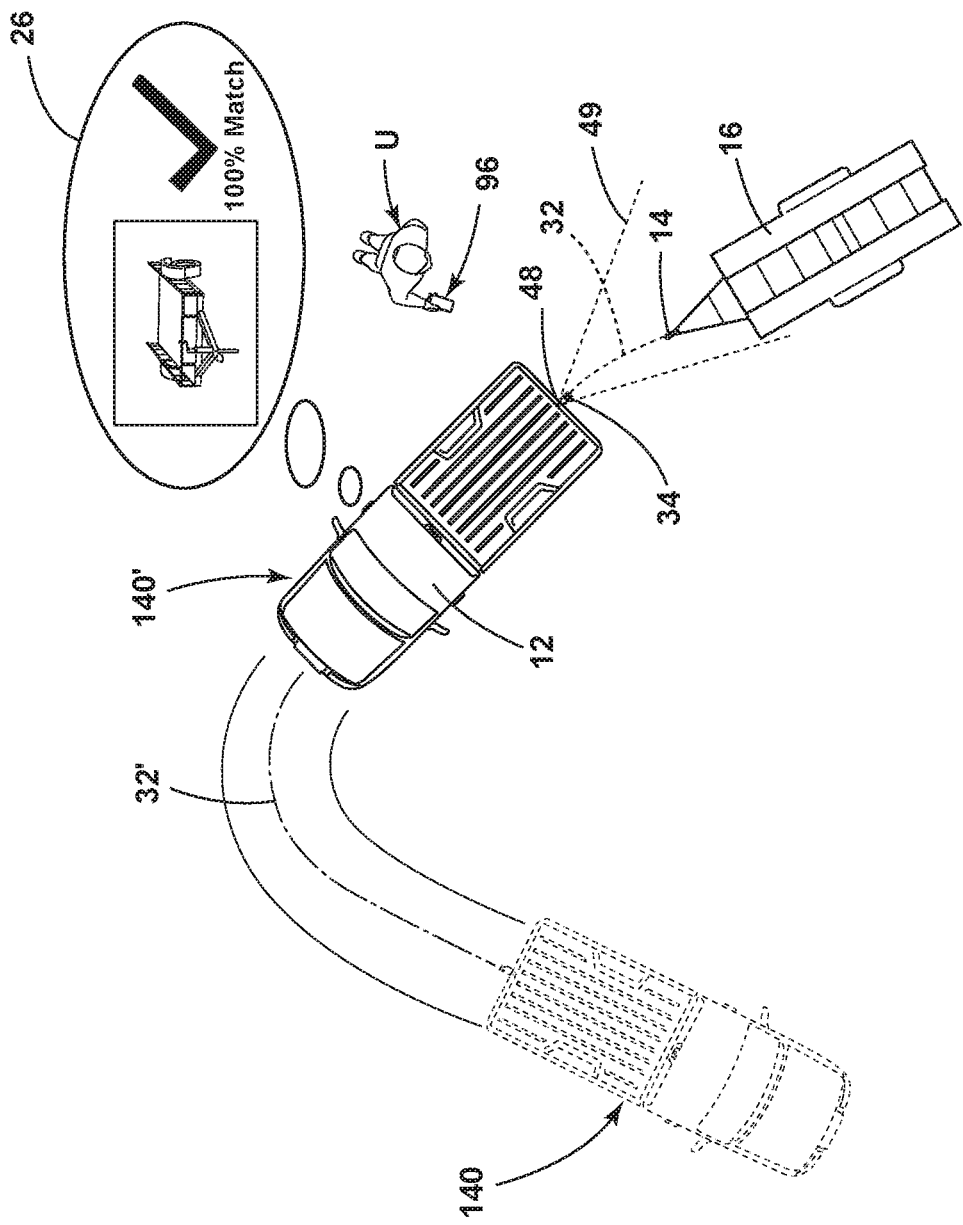
Figure 29:
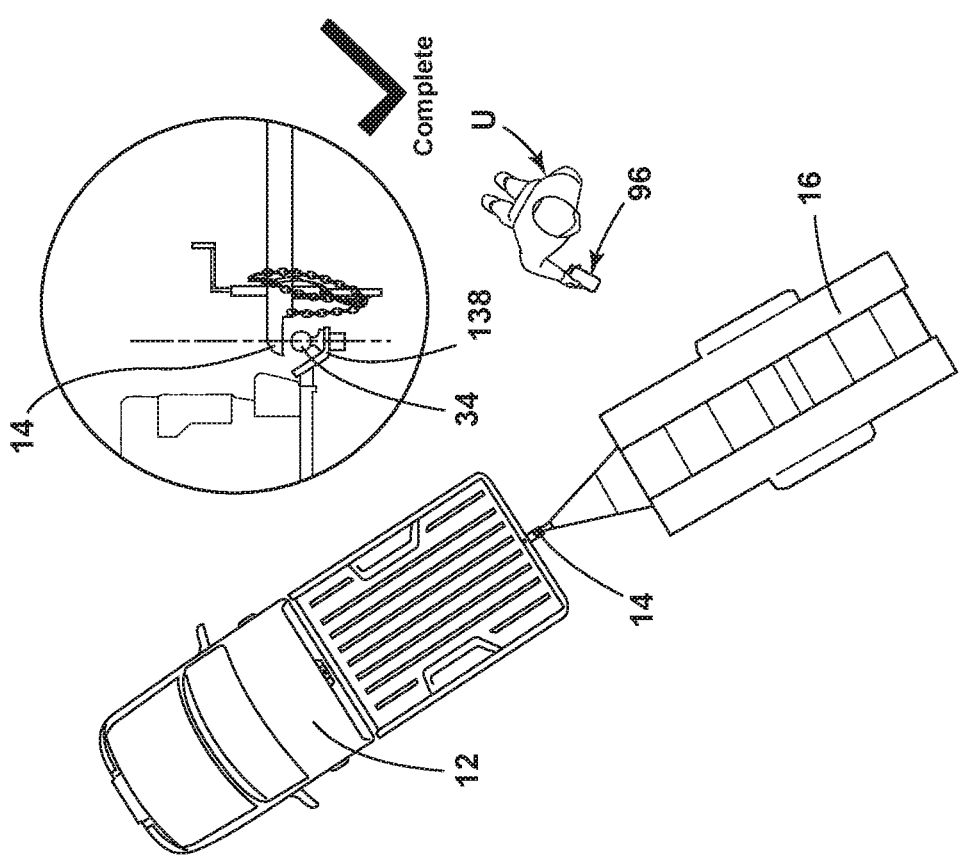
Figure 30:
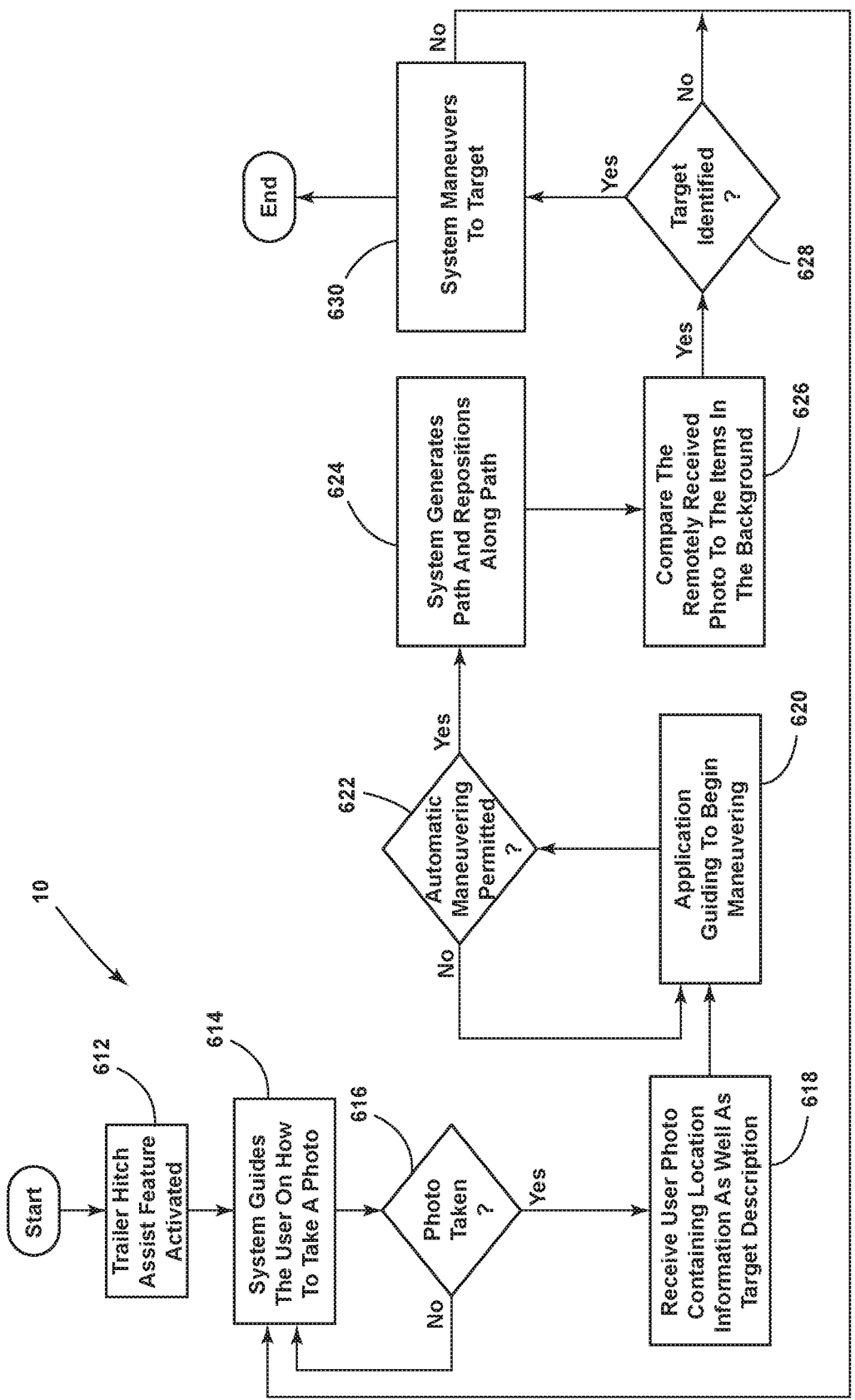
FIG. 30 is a flowchart depicting steps in a method for system operation to align the vehicle with the out-of-view trailer using the smartphone interface and camera.

With additional reference to the flowchart of FIG. 30, a method 610 for using smartphone 96 for vehicle guidance to a trailer 16 that is out of the field of view 49 of camera 48 is described according to an example. As shown, when the feature is started (step 612), which can be done using vehicle HMI 40 (with an instruction to open the application 106 on smartphone 96) or directly on smartphone 96 from outside of vehicle 12 using application 106, the application 106 guides the user U to take a photo of the trailer 16 (step 614). As shown in FIGS. 25A and 25B, the guidance may include coaching the user U to stand within a certain distance of the trailer coupler and to take the picture at the angle to which they would like the vehicle 12 to align to the trailer 16. A target 145 can be presented to help such alignment, as well. In one aspect, smartphone 96 may run some level of image processing on the image data 144 received from camera 136 on a real-time basis while the user U attempts to properly position the trailer 16 within the camera 136 image for detection. This image processing can be done to notify when the trailer 16 cannot be detected (by not being properly positioned within the image), as shown in FIG. 25A. When trailer 16 is detected (FIG. 25B), a corresponding notification 146 can be presented to the user U, which can signal that the alignment picture can be taken. In other aspects, the notifications 146 of FIGS. 25A and 25B can be presented after a photo is taken and analyzed. When the photo is taken (step 616), smartphone 96 can process the image data 144, along with the available sensor data (step 618) to communicate to the vehicle 12 the desired position 140 (including orientation) of trailer 16 relative to vehicle 12. The application 106 may present additional guidance for the user U to raise the coupler 14 at least some amount of vertical distance in order to permit completion of the hitching maneuver. The image processing by smartphone 96 can also be used to detect whether a locking device is present on coupler 14, with the application 106 giving instruction to remove a detected locking device before continuing. Similarly, the application 106 may ask the user U to check the hitch ball 34 size if there appears to be a diameter mismatch between the coupler 14 and hitch ball 34. Additionally, the application 106 may ask the user U to confirm when each of the above conditions is corrected by capturing another image of the coupler 14 after correcting the condition.

With respect to step 618, it is noted that variations of the described combination of the user-taken image of trailer 16 and the data obtained from sensors 142 can be transmitted in certain implementations or under certain conditions. For example, if the trailer coupler image file size is too large, the application 106 may transmit a reduced file-size image that includes only identified "features of interest" useable in the controller 26 to help match subsequent image data 55 from camera 48 to the image frame captured using the smartphone 96. Such a reduced file-size image can be generated by the application 106 performing edge detection using the smartphone 96, followed by quantization and encoding of the image data 144. In another example, one or more short video clips of trailer 16 and/or coupler 14 can be used. Such a clip can be generated by saving image data for a predetermined interval both before and after the "picture" is taken by the user U. In a further example, such clips can also be reduced in file size based on the techniques described above. The use of a video clip may provide the necessary amount of image frames to perform depth perception computations, which may improve the precision with which the application 106 or the controller 26 determines the location 140 of the trailer 16. The application 106 may also make estimate of the distance to the trailer 16 based on features of the trailer 16 in the image or video clip (in other examples, this estimate may be made by controller 26).

Figure 28:
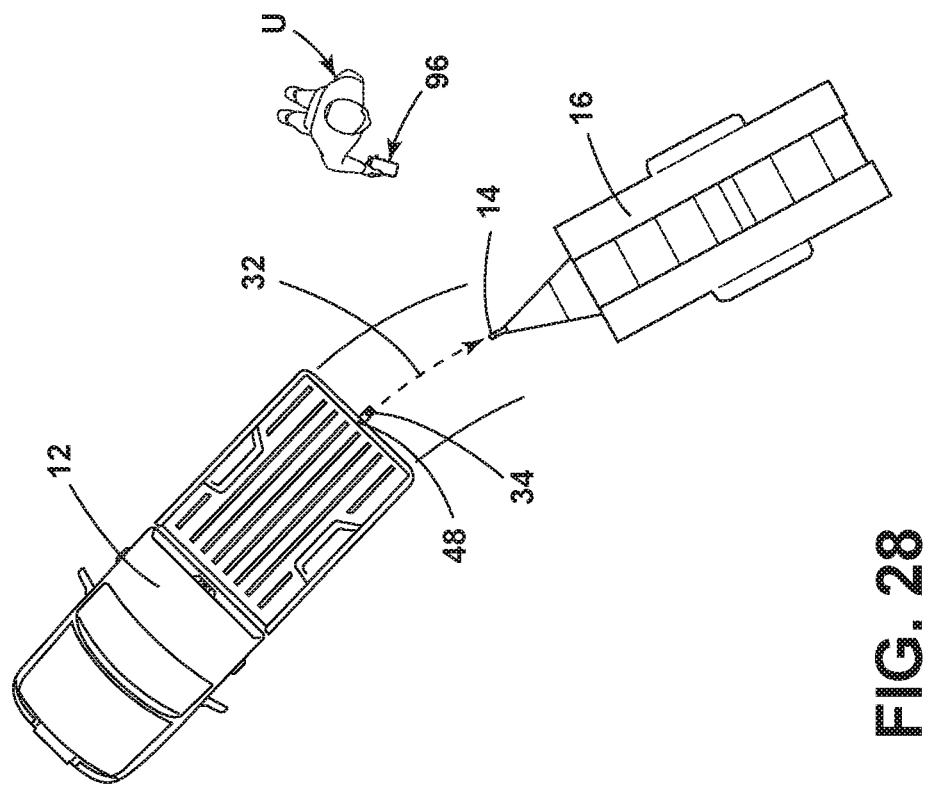

After controller 26 receives the data, as described above, from smartphone 96 and confirms that vehicle 12 conditions are valid to start an automated maneuver (step 618), controller 26 sends a signal to the smartphone 96 confirming it is ready to start an automatic vehicle alignment maneuver. The application 106 then prompts the user U to provide an input that is configured to require a certain amount of user engagement to maintain vehicle 12 motion (step 620). The user engagement input may take a variety of forms including tracing an orbital path on smartphone 96 screen 108, or holding down one or of the smartphone 96 buttons, providing an input sequence to the smartphone using a predetermined combination of touch inputs, button inputs, or the like. Once the user engagement input is received and maintained, according to the particular requirements (step 622), the application 106 determines that automatic maneuvering of vehicle 12 is permitted and transmits a corresponding signal to the controller 26. The controller 26 then derives a preliminary path 32' for vehicle 12 movement to achieve proper positioning of vehicle 12 relative to trailer 16 (FIG. 26) and moves vehicle 12 along such a path 32' as long as the input is maintained on smartphone 96 (step 624). During such movement, at least when controller 26 determines that trailer 16 is expected to be within the field of view 49 of camera 48, controller 26 beings monitoring image data 55 to attempt to identify trailer 16. When trailer is 16 detected within image data 55 (FIG. 27), controller 26 compares the image data 55 from imaging system 18 to the previously-obtained image data 144 from the smartphone 96 (step 626). If the trailer 16 in image data 55 is confirmed to match the trailer 16 in the smartphone 96 image (step 628), controller 26 runs the path derivation routine 66 using the image data 55 from vehicle 12 and executes the path derivation routine 66 (step 630) to back vehicle 12 such that hitch ball 34 aligns with the coupler 14 (FIGS. 28 and 30). In one implementation, as discussed above, controller 26 can continue to adjust path 32 so that vehicle 12 approaches the coupler 14 at the approach angle detected by processing the smartphone 96 image.

Figure 31:
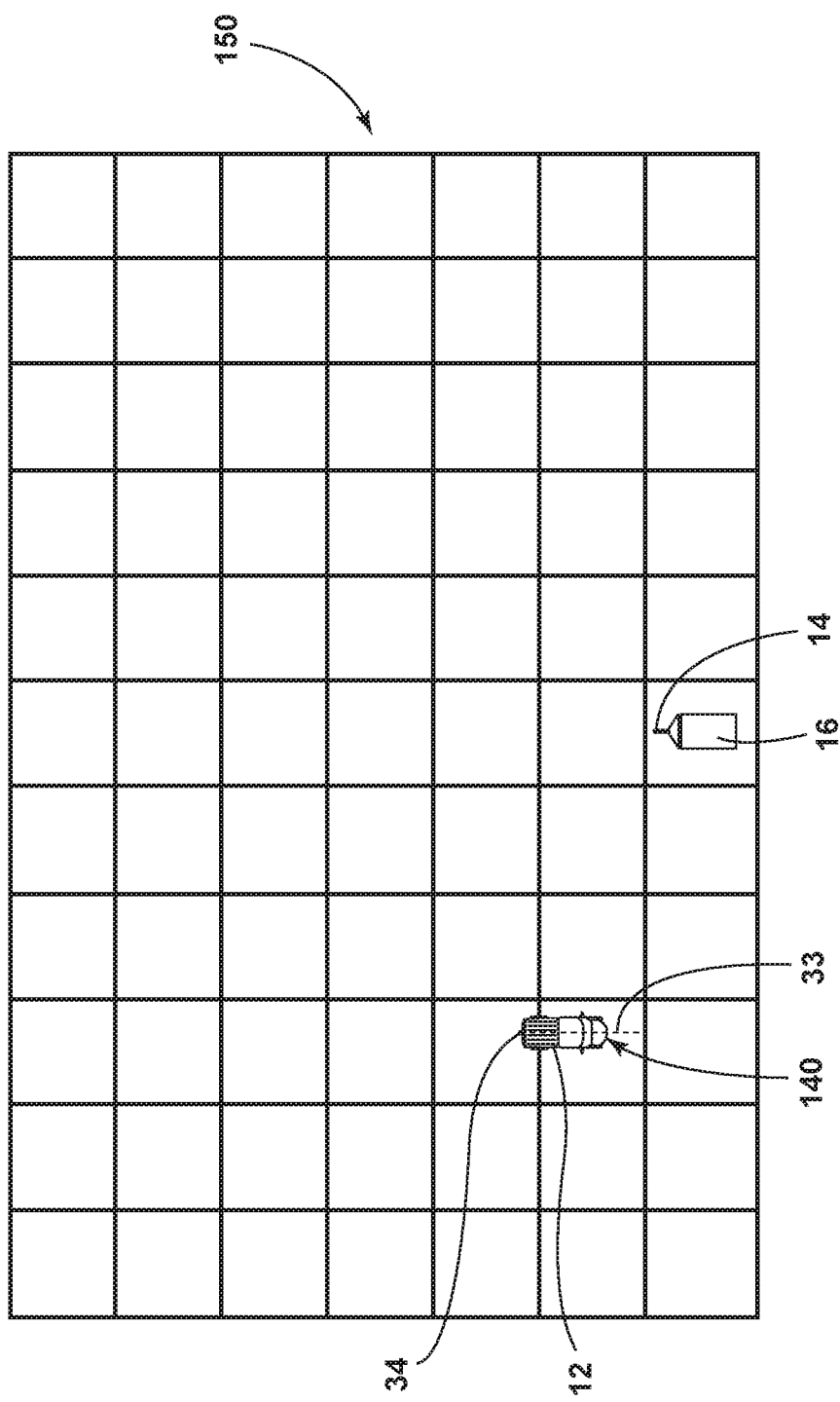
FIGS. 31-33 are depictions of an alternative interface for communicating the position of a vehicle relative to an out-of-view trailer according to a variation of the remote system operation.
Figure 32:
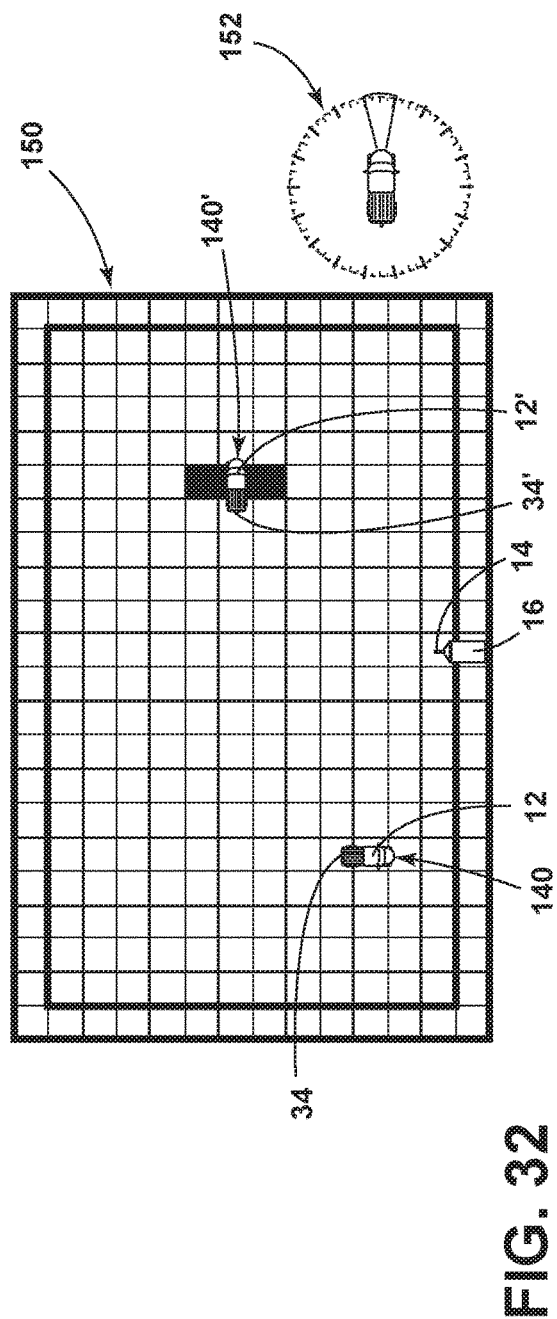
Figure 33:
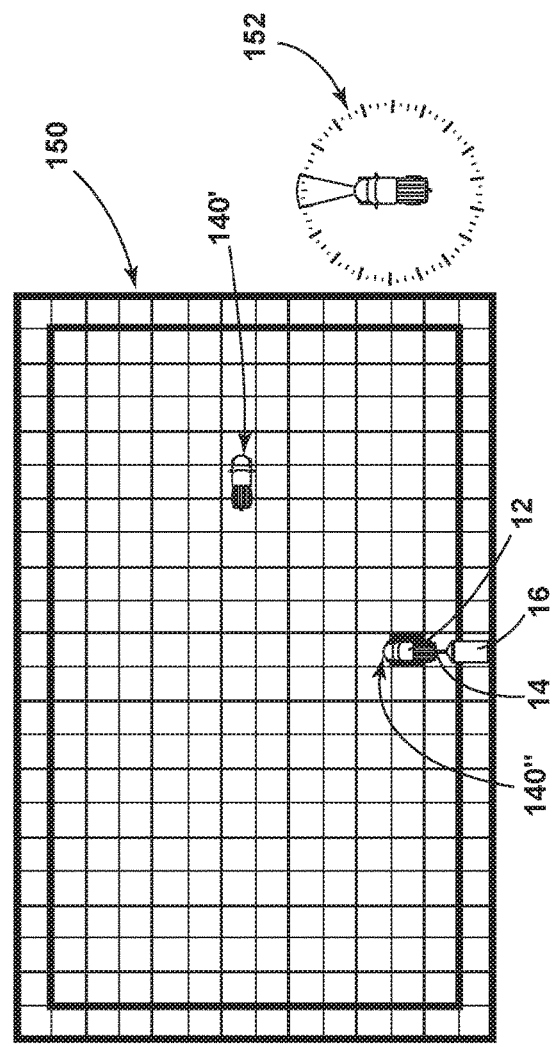

Turning now to FIGS. 31-33, in another additional or alternative functionality, system 10 can be configured to carry out the initial alignment maneuver by receiving a user input of an approximate position 148 and heading 33 of the vehicle 12 relative to the trailer 16 and using such approximations to generate the initial path 32' for moving vehicle 12 to a position in which trailer 16 can be acceptably identified in the image data 55. In this respect, if the user wishes to hitch vehicle 12 to trailer 16 in a location that is not stored in memory 62 (as discussed above), system 10 may provide an overhead view interface 150 on either vehicle HMI 40 or within smartphone 96 application 106 by which the user can indicate vehicle 12 location 148 and heading 33 relative to trailer 16. In the example of FIG. 31, the trailer 16 may be shown in a fixed location with the user placing and/or dragging a representation of vehicle 12 on a grid depicting a general area surrounding trailer 16. A separate interface 152 may be provided to adjust the heading 33 of vehicle 12 within the grid interface 150. When the relative location 148 and orientation of vehicle 12 has been confirmed by the user through interface 150, an initial path 32' can be derived in a similar manner to that which is discussed above to move vehicle into an intermediate position 148' that is intended to place vehicle 12 in a position where the trailer 16 is present within image data 55 for use of path derivation routine 66 and operating routine 68, according to the above description. As shown in FIG. 32, the intermediate position 148' can be presented on the interface 150 with, for example, colorization of adjacent grid blocks indicating that such position is intermediate. As shown in FIG. 33, the final position of vehicle 12 can also be illustrated, with the user being given an opportunity to adjust the final heading 33 of vehicle 12 relative to trailer 16 using interface 152. Progress of the vehicle 12 in its movement along path 32' to intermediate position 148' and from intermediate position 148' to the final position 148" can also be tracked on interface 150.

It is to be understood that variations and modifications can be made on the aforementioned system and related structures without departing from the concepts of the present disclosure, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A system for assisting in aligning a vehicle for hitching with a trailer, comprising:
    a vehicle steering system;
    a vehicle human-machine interface positioned within the vehicle;
    a wireless communication module;
    a detection system outputting a signal including scene data of an area to a rear of the vehicle; and
    a controller:
        receiving an automated hitching system activation command from a user within the vehicle, via the vehicle-human machine interface;
        after receiving the automated hitching system activation command, receiving, via the wireless communication module, an automated hitching initiation command by the user external to the vehicle from an external wireless device; and
        after receiving both the automated hitching system activation command and the automated hitching initiation command:
            receiving the scene data and identifying the trailer within the area to the rear of the vehicle;
            deriving a backing path to align a hitch ball mounted on the vehicle to a coupler of the trailer; and
            controlling the vehicle steering system to maneuver the vehicle including reversing along the backing path.

2. The system of claim 1, wherein:
    the controller remains in an idle state after receiving the system activation command until receiving the automated hitching initiation command from the external wireless device.

3. The system of claim 1, wherein the external wireless device is a smartphone including memory encoded with an application that facilitates communication of the smartphone with the wireless communication module, requests a user input of the automated hitching initiation command, and provides information related to a status of the controller in controlling the vehicle.

4. The system of claim 3, wherein the application further derives a travel zone of the vehicle along the backing path and displays a graphic representation of at least one desired range of user locations relative to the exterior of the vehicle, and outside the travel zone, in which the user is directed to be positioned during maneuvering of the vehicle including reversing along the backing path.

5. The system of claim 1, wherein the external wireless device is a key fob configured for wireless communication with the wireless communication module and including a button transmitting the automated hitching command when depressed by a user.

6. The system of claim 5, wherein:
    the key fob further includes a lighted element exposed on a portion thereof; and
    the controller identifies the lighted element in the scene data and associates a position of the lighted element with a position of the coupler of the trailer for use in deriving the backing path.

7. The system of claim 1, wherein the controller, while maneuvering the vehicle including reversing along the backing path, determines that the hitch ball is within a threshold distance of the coupler and pauses for a user confirmation that a height of the coupler relative to the hitch ball is acceptable before continuing maneuvering the vehicle including reversing along the backing path to vertically align the hitch ball with the coupler.

8. The system of claim 1, wherein, when the controller completes maneuvering the vehicle including reversing along the path, the controller further:
    receives a user indication of a direction and distance of misalignment between the hitch ball and the coupler along a driving plane;
    derives a correction backing path to realign the hitch ball to the coupler based on the user indication; and
    further controls the vehicle steering system to maneuver the vehicle including reversing along the correction backing path.

9. The system of claim 8, wherein:
    the external wireless device is a smartphone including memory encoded with an application that facilitates communication of the smartphone with the wireless communication module; and
    the controller receives the user indication via the wireless communication module from the smartphone.

10. The system of claim 8, further including an interaction detection system, wherein:
    the controller receives the user indication, in the form of a physical vehicle interaction, via the interaction detection system.

11. The system of claim 1, further including a powertrain control system within the vehicle, wherein:
    the controller further determines that the vehicle has reached the end of the path and deactivates the powertrain control system.

12. The system of claim 1, wherein the controller, upon receiving the scene data, determines that the trailer is not within the area to the rear of the vehicle and completes an initial alignment maneuver to position the vehicle relative to the trailer such that the trailer is within the area to the rear of the vehicle prior to deriving the backing path and maneuvering the vehicle along the path.

13. The system of claim 12, wherein the initial alignment maneuver includes determining a preliminary trailer position using data received from the external wireless device via the wireless communication module.

14. The system of claim 13, wherein:
    the external wireless device is a smartphone including memory encoded with an application that facilitates communication of the smartphone with the wireless communication module; and the data received from the external wireless device includes image, location, and heading data from the smartphone relative to the trailer and relative to the vehicle.

15. The system of claim 12, wherein completing the initial alignment maneuver includes determining a position of the vehicle, retrieving a stored location of the trailer from memory, and comparing the stored location of the trailer to the position of the vehicle.

16. The system of claim 12, wherein completing the initial alignment maneuver includes receiving a user input of an approximate position and heading of the vehicle relative to the trailer.

17. A vehicle, comprising:
a steering system;
a wireless communication module;
a detection system outputting a signal including scene data of an area to a rear of the vehicle; and
system for assisting in aligning the vehicle for hitching with a trailer, including a controller:
  receiving, via the wireless communication module, an automated hitching initiation command from an external wireless device including memory encoded with an application that facilitates communication of the external wireless device with the wireless communication module;
  receiving the scene data and identifying the trailer within the area to the rear of the vehicle;
  deriving a backing path to align a hitch ball mounted on the vehicle to a coupler of the trailer, and further deriving a travel zone of the vehicle along the backing path;
  causing the external wireless device to display a graphic representation of at least one desired range of user locations relative to the exterior of the vehicle, and outside the travel zone, in which the application directs the user to be positioned during maneuvering of the vehicle including reversing along the backing path; and
  controlling the vehicle steering system to maneuver the vehicle including reversing along the backing path.

18. The vehicle of claim 17, wherein the external wireless device is a smartphone including the memory encoded with the application that further requests a user input of the automated hitching initiation command, and provides information related to a status of the controller in controlling the vehicle.

19. The vehicle of claim 18, wherein:
the controller, upon receiving the scene data, determines that the trailer is not within the area to the rear of the vehicle and completes an initial alignment maneuver to position the vehicle relative to the trailer such that the trailer is within the area to the rear of the vehicle prior to deriving the backing path and maneuvering the vehicle along the path;
the initial alignment maneuver includes determining a preliminary trailer position using data received from the external wireless device via the wireless communication module; and
the data received from the external wireless device includes image, location, and heading data from the smartphone relative to the trailer and relative to the vehicle.

20. A method for assisting a vehicle in hitching with a trailer, comprising:
receiving an automated hitching system activation command from a user within the vehicle, via a vehicle-human machine interface within the vehicle;
after receiving the automated hitching system activation command, receiving, via a wireless communication module within the vehicle, an automated hitching initiation command from a user, via an external wireless device positioned outside the vehicle;
after receiving both the automated hitching system activation command and the automated hitching initiation command:
  receiving scene data of an area to a rear of the vehicle from a detection system outputting a signal including the scene data and identifying the trailer within the area to the rear of the vehicle;
  deriving a backing path to align a hitch ball mounted on the vehicle to a coupler of the trailer;
  controlling a vehicle steering system to maneuver the vehicle including reversing along the backing path; and
  while maneuvering the vehicle including reversing along the backing path, determining that the hitch ball is within a threshold distance of the coupler and pausing for a user confirmation that a height of the coupler relative to the hitch ball is acceptable before continuing maneuvering the vehicle including reversing along the backing path to vertically align the hitch ball with the coupler.

* * * * *